(12) United States Patent
Levy et al.

(10) Patent No.: US 8,103,879 B2
(45) Date of Patent: Jan. 24, 2012

(54) PROCESSING AUDIO OR VIDEO CONTENT WITH MULTIPLE WATERMARK LAYERS

(75) Inventors: Kenneth L. Levy, Stevenson, WA (US); R. Stephen Hiatt, Portland, OR (US); Geoffrey B. Rhoads, West Linn, OR (US)

(73) Assignee: Digimarc Corporation, Beaverton, OR (US)

(*) Notice: Subject to any disclaimer, the term of this patent is extended or adjusted under 35 U.S.C. 154(b) by 205 days.

(21) Appl. No.: 12/555,618

(22) Filed: Sep. 8, 2009

(65) Prior Publication Data

US 2010/0226525 A1 Sep. 9, 2010

Related U.S. Application Data

(63) Continuation of application No. 11/153,520, filed on Jun. 14, 2005, now Pat. No. 7,587,601, which is a continuation of application No. 10/017,679, filed on Dec. 13, 2001, now abandoned, application No. 12/555,618, which is a continuation-in-part of application No. 09/186,962, filed on Nov. 5, 1998, now Pat. No. 7,171,016, which is a continuation of application No. 08/649,419, filed on May 16, 1996, now Pat. No. 5,862,260, and a continuation-in-part of application No. 08/637,531, filed on Apr. 25, 1996, now Pat. No. 5,822,436.

(60) Provisional application No. 60/256,628, filed on Dec. 18, 2000, provisional application No. 60/336,209, filed on Oct. 30, 2001.

(51) Int. Cl.
*H04L 29/06* (2006.01)
*H04L 9/32* (2006.01)

(52) U.S. Cl. .................. 713/176; 713/168; 713/150

(58) Field of Classification Search .................. 713/150, 713/168, 176
See application file for complete search history.

(56) References Cited

U.S. PATENT DOCUMENTS 4,807,031 A 2/1989 Broughton et al.
(Continued)

FOREIGN PATENT DOCUMENTS

DE 3806414 9/1989
(Continued)

OTHER PUBLICATIONS

Watermark re-synchronization using log-polar mapping of image autocorrelation; lattar, A.M.; Meyer, J.; Circuits and Systems, 2003. ISCAS '03. Proceedings of the 2003 International Symposium on; vol. 2; Publication Year: 2003 , pp. II-928-II-931 vol. 2.*

(Continued)

*Primary Examiner* — David Y Jung

(57) ABSTRACT

The present invention relates generally to audio and video processing, e.g., with digital watermarking. One claim recites an apparatus including: electronic memory for buffering data representing audio or video, and an electronic processor. The electronic processor is programmed for: (i) controlling receipt of data representing audio or video, the data representing audio or video comprising at least two digital watermark layers, the first watermark layer comprising a content identifier which uniquely identifies the content, and the second watermark layer comprising a distributor identifier which identifies a distributor or distribution channel associated with the content; and (ii) embedding a third watermark layer in the audio or video, in which the third watermark layer is embedded through alterations to data representing audible portions of the audio or through alterations to data representing video picture elements of the video, and in which each of the first watermark layer, the second watermark layer and the third digital watermark layer are embedded in the audio or video content with different watermark protocols or different watermark keys. Of course, other claims are provided as well.

7 Claims, 6 Drawing Sheets

U.S. PATENT DOCUMENTS

| | | |
|---|---|---|
| 4,855,827 A | 8/1989 | Best |
| 4,931,871 A | 6/1990 | Kramer |
| 4,969,041 A | 11/1990 | O'Grady et al. |
| 5,243,423 A | 9/1993 | DeJean et al. |
| 5,319,735 A | 6/1994 | Preuss et al. |
| 5,385,371 A | 1/1995 | Izawa |
| 5,436,653 A | 7/1995 | Ellis et al. |
| 5,463,209 A | 10/1995 | Figh et al. |
| 5,481,294 A | 1/1996 | Thomas et al. |
| 5,495,581 A | 2/1996 | Tsai |
| 5,526,427 A | 6/1996 | Thomas et al. |
| 5,574,962 A | 11/1996 | Fardeau et al. |
| 5,579,124 A | 11/1996 | Aijala et al. |
| 5,613,004 A | 3/1997 | Cooperman et al. |
| 5,640,193 A | 6/1997 | Wellner |
| 5,659,164 A | 8/1997 | Schmid et al. |
| 5,671,282 A | 9/1997 | Wolff et al. |
| 5,699,427 A | 12/1997 | Chow et al. |
| 5,710,834 A * | 1/1998 | Rhoads |
| 5,715,403 A | 2/1998 | Stefik |
| 5,721,788 A | 2/1998 | Powell et al. |
| 5,761,606 A | 6/1998 | Wolzien |
| 5,765,152 A | 6/1998 | Erickson |
| 5,774,452 A | 6/1998 | Wolosewicz |
| 5,822,432 A | 10/1998 | Moskowitz et al. |
| 5,822,436 A * | 10/1998 | Rhoads |
| 5,832,119 A * | 11/1998 | Rhoads |
| 5,838,458 A | 11/1998 | Tsai |
| 5,841,886 A * | 11/1998 | Rhoads |
| 5,841,978 A * | 11/1998 | Rhoads |
| 5,862,260 A | 1/1999 | Rhoads |
| 5,892,900 A | 4/1999 | Ginter et al. |
| 5,903,729 A | 5/1999 | Reber et al. |
| 5,905,248 A | 5/1999 | Russell et al. |
| 5,905,800 A | 5/1999 | Moskowitz et al. |
| 5,905,819 A | 5/1999 | Daly |
| 5,932,863 A | 8/1999 | Rathus et al. |
| 5,933,829 A | 8/1999 | Durst et al. |
| 5,943,422 A | 8/1999 | Van Wie et al. |
| 5,949,885 A | 9/1999 | Leighton |
| 5,963,909 A | 10/1999 | Warren et al. |
| 5,978,773 A | 11/1999 | Hudetz et al. |
| 6,031,914 A | 2/2000 | Tewfik et al. |
| 6,121,530 A | 9/2000 | Sonoda |
| 6,122,403 A | 9/2000 | Rhoads |
| 6,141,753 A | 10/2000 | Zhao et al. |
| 6,154,571 A | 11/2000 | Cox et al. |
| 6,175,639 B1 | 1/2001 | Satoh et al. |
| 6,185,683 B1 | 2/2001 | Ginter et al. |
| 6,229,924 B1 * | 5/2001 | Rhoads et al. |
| 6,233,684 B1 | 5/2001 | Stefik et al. |
| 6,246,775 B1 | 6/2001 | Nakamura et al. |
| 6,246,777 B1 | 6/2001 | Agarwal |
| 6,272,176 B1 | 8/2001 | Srinivasan |
| 6,272,634 B1 | 8/2001 | Tewfik et al. |
| 6,285,774 B1 | 9/2001 | Schumann et al. |
| 6,307,949 B1 * | 10/2001 | Rhoads |
| 6,311,214 B1 | 10/2001 | Rhoads |
| 6,332,031 B1 | 12/2001 | Rhoads et al. |
| 6,345,256 B1 | 2/2002 | Milsted et al. |
| 6,381,341 B1 * | 4/2002 | Rhoads |
| 6,385,329 B1 * | 5/2002 | Sharma et al. |
| 6,389,055 B1 | 5/2002 | August et al. |
| 6,408,082 B1 * | 6/2002 | Rhoads et al. |
| 6,421,070 B1 * | 7/2002 | Ramos et al. |
| 6,424,725 B1 * | 7/2002 | Rhoads et al. |
| 6,425,081 B1 | 7/2002 | Iwamura |
| 6,427,012 B1 | 7/2002 | Petrovic |
| 6,427,020 B1 * | 7/2002 | Rhoads |
| 6,430,301 B1 | 8/2002 | Petrovic |
| 6,456,726 B1 | 9/2002 | Yu et al. |
| 6,505,160 B1 | 1/2003 | Levy et al. |
| 6,516,079 B1 * | 2/2003 | Rhoads et al. |
| 6,522,770 B1 * | 2/2003 | Seder et al. |
| 6,535,617 B1 * | 3/2003 | Hannigan et al. |
| 6,542,927 B2 | 4/2003 | Rhoads |
| 6,553,129 B1 * | 4/2003 | Rhoads |
| 6,560,349 B1 | 5/2003 | Rhoads |
| 6,567,533 B1 * | 5/2003 | Rhoads |
| 6,574,350 B1 | 6/2003 | Rhoads et al. |
| 6,580,806 B1 | 6/2003 | Sato |
| 6,580,808 B2 * | 6/2003 | Rhoads |
| 6,590,996 B1 * | 7/2003 | Reed et al. |
| 6,611,607 B1 * | 8/2003 | Davis et al. |
| 6,614,914 B1 | 9/2003 | Rhoads et al. |
| 6,636,615 B1 * | 10/2003 | Rhoads et al. |
| 6,647,128 B1 * | 11/2003 | Rhoads |
| 6,647,130 B2 * | 11/2003 | Rhoads |
| 6,650,761 B1 * | 11/2003 | Rodriguez et al. |
| 6,654,479 B1 | 11/2003 | Liao et al. |
| 6,662,198 B2 | 12/2003 | Satyanarayanan et al. |
| 6,681,028 B2 * | 1/2004 | Rhoads et al. |
| 6,681,029 B1 * | 1/2004 | Rhoads |
| 6,694,042 B2 * | 2/2004 | Seder et al. |
| 6,694,043 B2 * | 2/2004 | Seder et al. |
| 6,700,990 B1 * | 3/2004 | Rhoads |
| 6,700,995 B2 | 3/2004 | Reed |
| 6,704,869 B2 | 3/2004 | Geoffrey et al. |
| 6,718,046 B2 | 4/2004 | Reed et al. |
| 6,718,047 B2 | 4/2004 | Rhoads |
| 6,721,440 B2 | 4/2004 | Reed et al. |
| 6,728,390 B2 | 4/2004 | Rhoads et al. |
| 6,744,906 B2 | 6/2004 | Rhoads et al. |
| 6,760,463 B2 | 7/2004 | Rhoads |
| 6,763,123 B2 | 7/2004 | Reed et al. |
| 6,768,809 B2 | 7/2004 | Rhoads et al. |
| 6,775,392 B1 | 8/2004 | Rhoads |
| 6,785,815 B1 | 8/2004 | Serret-Avila et al. |
| 6,798,894 B2 | 9/2004 | Rhoads |
| 6,807,285 B1 | 10/2004 | Iwamura |
| 6,813,366 B1 | 11/2004 | Rhoads |
| 6,871,180 B1 | 3/2005 | Neuhauser et al. |
| 6,879,701 B1 | 4/2005 | Rhoads |
| 6,915,481 B1 | 7/2005 | Tewfik et al. |
| 6,917,724 B2 | 7/2005 | Seder et al. |
| 6,920,232 B2 | 7/2005 | Rhoads |
| 6,922,480 B2 | 7/2005 | Rhoads |
| 6,947,571 B1 | 9/2005 | Rhoads et al. |
| 6,975,746 B2 | 12/2005 | Davis et al. |
| 6,988,202 B1 | 1/2006 | Rhoads et al. |
| 6,990,584 B1 | 1/2006 | Yoshiura et al. |
| 6,996,252 B2 | 2/2006 | Reed et al. |
| 7,003,731 B1 | 2/2006 | Rhoads et al. |
| 7,006,555 B1 | 2/2006 | Srinivasan |
| 7,006,662 B2 | 2/2006 | Alattar et al. |
| 7,020,304 B2 | 3/2006 | Alattar et al. |
| 7,024,016 B2 | 4/2006 | Rhoads et al. |
| 7,027,614 B2 | 4/2006 | Reed |
| 7,035,427 B2 | 4/2006 | Rhoads |
| 7,044,395 B1 | 5/2006 | Rhoads et al. |
| 7,051,086 B2 | 5/2006 | Rhoads et al. |
| 7,054,465 B2 | 5/2006 | Rhoads |
| 7,062,069 B2 | 6/2006 | Rhoads |
| 7,095,871 B2 | 8/2006 | Jones et al. |
| 7,111,170 B2 | 9/2006 | Rhoads et al. |
| 7,113,614 B2 | 9/2006 | Rhoads |
| 7,139,408 B2 | 11/2006 | Rhoads et al. |
| 7,158,654 B2 | 1/2007 | Rhoads |
| 7,164,780 B2 | 1/2007 | Brundage et al. |
| 7,171,016 B1 | 1/2007 | Rhoads |
| 7,171,020 B2 | 1/2007 | Rhoads et al. |
| 7,174,031 B2 | 2/2007 | Rhoads et al. |
| 7,177,443 B2 | 2/2007 | Rhoads |
| 7,197,160 B2 | 3/2007 | Rhoads et al. |
| 7,213,757 B2 | 5/2007 | Jones et al. |
| 7,224,819 B2 | 5/2007 | Levy et al. |
| 7,248,717 B2 | 7/2007 | Rhoads |
| 7,261,612 B1 | 8/2007 | Hannigan et al. |
| 7,289,643 B2 | 10/2007 | Brunk et al. |
| 7,298,864 B2 | 11/2007 | Jones |
| 7,305,104 B2 | 12/2007 | Carr et al. |
| 7,308,110 B2 | 12/2007 | Rhoads |
| 7,313,251 B2 | 12/2007 | Rhoads |
| 7,319,775 B2 | 1/2008 | Sharma et al. |
| 7,330,564 B2 | 2/2008 | Brundage et al. |
| 7,359,528 B2 | 4/2008 | Rhoads |
| 7,369,678 B2 | 5/2008 | Rhoads |

| Patent/Pub No. | Date | Inventor |
|---|---|---|
| 7,377,421 B2 | 5/2008 | Rhoads |
| 7,391,880 B2 | 6/2008 | Reed et al. |
| 7,400,743 B2 | 7/2008 | Rhoads et al. |
| 7,406,214 B2 | 7/2008 | Rhoads et al. |
| 7,424,131 B2 | 9/2008 | Alattar et al. |
| 7,427,030 B2 | 9/2008 | Jones et al. |
| 7,433,491 B2 | 10/2008 | Rhoads |
| 7,444,000 B2 | 10/2008 | Rhoads |
| 7,444,392 B2 | 10/2008 | Rhoads et al. |
| 7,450,734 B2 | 11/2008 | Rodriguez et al. |
| 7,460,726 B2 | 12/2008 | Levy et al. |
| 7,466,840 B2 | 12/2008 | Rhoads |
| 7,486,799 B2 | 2/2009 | Rhoads |
| 7,499,566 B2 | 3/2009 | Rhoads |
| 7,502,490 B2 | 3/2009 | Rhoads et al. |
| 7,502,759 B2 | 3/2009 | Hannigan et al. |
| 7,508,955 B2 | 3/2009 | Carr et al. |
| 7,515,733 B2 | 4/2009 | Rhoads |
| 7,536,034 B2 | 5/2009 | Rhoads et al. |
| 7,537,170 B2 | 5/2009 | Reed et al. |
| 7,545,952 B2 | 6/2009 | Brundage et al. |
| 7,561,714 B2 | 7/2009 | Tian et al. |
| 7,564,992 B2 | 7/2009 | Rhoads |
| RE40,919 E | 9/2009 | Rhoads |
| 7,587,601 B2 | 9/2009 | Levy |
| 7,602,978 B2 | 10/2009 | Levy et al. |
| 7,628,320 B2 | 12/2009 | Rhoads |
| 7,643,649 B2 | 1/2010 | Davis et al. |
| 7,650,009 B2 | 1/2010 | Rhoads |
| 7,653,210 B2 | 1/2010 | Rhoads |
| 7,657,058 B2 | 2/2010 | Sharma |
| 7,685,426 B2 | 3/2010 | Ramos et al. |
| 7,693,300 B2 | 4/2010 | Reed et al. |
| 7,697,719 B2 | 4/2010 | Rhoads |
| 7,711,143 B2 | 5/2010 | Rhoads |
| 7,724,919 B2 | 5/2010 | Rhoads |
| 7,738,673 B2 | 6/2010 | Reed |
| 7,747,038 B2 | 6/2010 | Rhoads |
| 7,751,588 B2 | 7/2010 | Rhoads |
| 7,751,596 B2 | 7/2010 | Rhoads |
| 7,756,290 B2 | 7/2010 | Rhoads |
| 7,760,905 B2 | 7/2010 | Rhoads et al. |
| 7,762,468 B2 | 7/2010 | Reed et al. |
| 7,787,653 B2 | 8/2010 | Rhoads |
| 7,792,325 B2 | 9/2010 | Rhoads et al. |
| 7,805,500 B2 | 9/2010 | Rhoads |
| 7,822,225 B2 | 10/2010 | Alattar |
| 7,837,094 B2 | 11/2010 | Rhoads |
| 2001/0016052 A1 | 8/2001 | Miller |
| 2001/0019611 A1 | 9/2001 | Hilton |
| 2001/0026618 A1 | 10/2001 | Van Wie et al. |
| 2001/0034705 A1 | 10/2001 | Rhoads et al. |
| 2001/0047428 A1 | 11/2001 | Hunter |
| 2001/0047478 A1 | 11/2001 | Mase |
| 2001/0052076 A1 | 12/2001 | Kadono |
| 2001/0053238 A1 | 12/2001 | Katsura et al. |
| 2001/0055407 A1 | 12/2001 | Rhoads |
| 2002/0009208 A1 | 1/2002 | Alattar et al. |
| 2002/0097891 A1 | 7/2002 | Hinishi |
| 2002/0106105 A1 | 8/2002 | Pelly et al. |
| 2002/0131076 A1 | 9/2002 | Davis |
| 2002/0150246 A1 | 10/2002 | Ogino |
| 2002/0176003 A1 | 11/2002 | Seder et al. |
| 2002/0186886 A1 | 12/2002 | Rhoads |
| 2002/0191856 A1 | 12/2002 | Umeda et al. |
| 2002/0196272 A1 | 12/2002 | Ramos et al. |
| 2003/0040957 A1 | 2/2003 | Rhoads et al. |
| 2003/0105730 A1 | 6/2003 | Davis et al. |
| 2003/0130954 A1 | 7/2003 | Carr et al. |
| 2004/0005093 A1 | 1/2004 | Rhoads |
| 2004/0190750 A1 | 9/2004 | Rodriguez et al. |
| 2004/0240704 A1 | 12/2004 | Reed |
| 2004/0264733 A1 | 12/2004 | Rhoads et al. |
| 2005/0041835 A1 | 2/2005 | Reed et al. |
| 2005/0058318 A1 | 3/2005 | Rhoads |
| 2005/0192933 A1 | 9/2005 | Rhoads et al. |
| 2006/0013435 A1 | 1/2006 | Rhoads |
| 2006/0041591 A1 | 2/2006 | Rhoads |
| 2006/0251291 A1 | 11/2006 | Rhoads |
| 2007/0033409 A1 | 2/2007 | Brunk et al. |
| 2007/0055884 A1 | 3/2007 | Rhoads |
| 2007/0101147 A1 | 5/2007 | Brunk et al. |
| 2007/0108287 A1 | 5/2007 | Davis et al. |
| 2007/0154064 A1 | 7/2007 | Rhoads et al. |
| 2007/0276841 A1 | 11/2007 | Rhoads et al. |
| 2007/0276928 A1 | 11/2007 | Rhoads et al. |
| 2008/0121728 A1 | 5/2008 | Rodriguez |
| 2008/0133555 A1 | 6/2008 | Rhoads et al. |
| 2008/0292134 A1 | 11/2008 | Sharma et al. |
| 2009/0012944 A1 | 1/2009 | Rodriguez et al. |
| 2009/0089586 A1 | 4/2009 | Brunk et al. |
| 2009/0089587 A1 | 4/2009 | Brunk et al. |
| 2009/0116687 A1 | 5/2009 | Rhoads et al. |
| 2009/0125475 A1 | 5/2009 | Rhoads et al. |
| 2009/0129627 A1 | 5/2009 | Levy et al. |
| 2009/0232352 A1 | 9/2009 | Carr et al. |
| 2009/0286572 A1 | 11/2009 | Rhoads et al. |
| 2009/0290754 A1 | 11/2009 | Rhoads |
| 2010/0027837 A1 | 2/2010 | Levy et al. |
| 2010/0045816 A1 | 2/2010 | Rhoads |
| 2010/0054529 A1 | 3/2010 | Rhoads |
| 2010/0062819 A1 | 3/2010 | Hannigan et al. |
| 2010/0094639 A1 | 4/2010 | Rhoads |
| 2010/0142749 A1 | 6/2010 | Ellingson et al. |
| 2010/0172540 A1 | 7/2010 | Davis et al. |
| 2010/0198941 A1 | 8/2010 | Rhoads |
| 2010/0296526 A1 | 11/2010 | Rhoads |
| 2011/0007936 A1 | 1/2011 | Rhoads |

FOREIGN PATENT DOCUMENTS

| | | |
|---|---|---|
| EP | 0493091 | 7/1992 |
| WO | WO 99/45707 | 9/1999 |
| WO | WO 01/06755 | 1/2001 |
| WO | WO 01/39121 | 5/2001 |
| WO | WO 01/73997 | 10/2001 |
| WO | WO 01/76253 | 10/2001 |

OTHER PUBLICATIONS

Enhancing the robustness of Digimarc digital watermarking plug-ins in photoshop; Li Li; Xiaojun Fang; Li Wei; Communication Technology, 2008. ICCT 2008. 11th IEEE International Conference on ; Publication Year: 2008 , pp. 757-760.*

A Watermark Extraction Model to Enhance the Correlation of Digimarc Plug-ins in Photoshop; Li Li; Hehuan Xu; Chin Chen Cheng; Multimedia Information Networking and Security, 2009. MINES '09. International Conference on vol. 2 ; Publication Year: 2009 , pp. 154-158.*

Craver et al., "Can Invisible Watermarks Resolve Rightful Ownerships?" IBM Technical Report RC 20509, Jul. 25, 1996, 23 pages.

Dautzenberg, "Watermarking Images," Department of Microelectronics and Electrical Engineering, Trinity College Dublin, 58 pages, Oct. 1994.

Ghias et al, Query by Humming: Musical Information Retrieval In An Audio Database. In ACM Multimedia, pp. 231-236, Nov. 1995.

Kageyama et al, Melody Retrieval with Humming, Proceedings of Int. Computer Music Conference (ICMC), 1993, pp. 349-351, (English translation not available).

Wagner, "Fingerprinting," 1983 IEEE, pp. 18-22.

Komatsu, N., "Information Security for Fascimile Communication," Journal of the Institute of Image Electronics Engineers of Japan, 1990, vol. 19 No. 4, pp. 229-235.

Matsutani, "The Construction of Copyright-Protected Image Data Technical Report of IEICE," ISEC94-58, 1995, 20 pages.

Wold et al, Content-Based Classification, Search, and Retrieval of Audio, IEEE Multimedia Magazine, Fall, 1996, pp. 27-36.

Zhao, "A WWW Service to Embed and Prove Digital Copyright Watermarks," Proc. of the Euro. Conf. on Multimedia Applications, Services and Techniques, May 1996, 15 pages.

U.S. Appl. No. 08/635,531, filed Apr. 25, 1996, Geoffrey B. Rhoads.
U.S. Appl. No. 09/413,117, filed Oct. 6, 1999, Geoffrey B. Rhoads.
U.S. Appl. No. 09/507,096, filed Feb. 17, 2000, Geoffrey B. Rhoads et al.
U.S. Appl. No. 12/912,461, filed Oct. 26, 2010, Adnan M. Alattar.
U.S. Appl. No. 09/482,749, filed Jan. 13, 2000, Geoffrey B. Rhoads.

U.S. Appl. No. 09/234,780, filed Jan. 20, 1999, Geoffrey B. Rhoads.
U.S. Appl. No. 09/343,104, filed Jun. 29, 1999, Tony F. Rodriguez et al.
U.S. Appl. No. 09/697,009, filed Oct. 25, 2000, Bruce L. Davis et al.
U.S. Appl. No. 09/967,015, filed Oct. 25, 2000, Bruce L. Davis.
U.S. Appl. No. 09/633,587, filed Aug. 7, 2000, Geoffrey B. Rhoads et al.
U.S. Appl. No. 09/567,405, filed May 8, 2000, Geoffrey B. Rhoads et al.
U.S. Appl. No. 09/689,289, filed Oct. 11, 2000, Geoffrey B. Rhoads et al.
U.S. Appl. No. 09/629,649, filed Aug. 1, 2000, J. Scott Carr et al.
U.S. Appl. No. 09/552,998, filed Apr. 19, 2000, Tony F. Rodriguez et al.
U.S. Appl. No. 09/343,101, filed Jun. 29, 1999, Bruce L. Davis et al.
U.S. Appl. No. 12/953,190, filed Nov. 23, 2010, Geoffrey B. Rhoads.
U.S. Appl. No. 09/538,493, filed Mar. 30, 2000, Geoffrey B. Rhoads.

* cited by examiner

FIG. 7

Connected-Content Response: Response interface with desired informaiton

| Central Servers |
|---|

Connected-Content Message: XML Header and Body Interface, with Header containing vendor and application information, and Body with Application Message and context data.

Rendering Application

Application Message: Rendering application interface containing content owner, distributor, and respective object IDs and related data

| Watermark Reader 1 | | Watermark Reader N |
|---|---|---|
| Reader User Interface 1 | ○  ○  ○ | Reader User Interface N |
| Watermark Payload: Format of data bits | | |
| Reader Algorithm Kernel 1 | ○  ○  ○ | Reader Algorithm Kernel N |

Watermark protocol: Format of embedded bits

| Content |
|---|

FIG. 8

Connected-Content Response: Response interface with desired informaiton

| Central Servers |
|---|

Connected-Content Message: XML Header and Body Interface, with Header containing vendor and application information, and Body with Application Message and context data.

Rendering Application

Application Message: Rendering application interface containing content owner, distributor, and respective object IDs and related data

| Watermark Reader 1 | | Watermark Reader N |
|---|---|---|
| Reader User Interface 1 | ○  ○  ○ | Reader User Interface N |
| Watermark Payload: Format of data bits | | |
| Reader Algorithm Kernel 1 | ○  ○  ○ | Reader Algorithm Kernel N |

Watermark protocol: Format of embedded bits

| Content |
|---|

FIG. 11

Connected-Content Response: Response interface with desired informaiton

| Central Servers |
|---|

Connected-Content Message: XML Header and Body Interface, with Header containing vendor and application information, and Body with Application Message and context data.

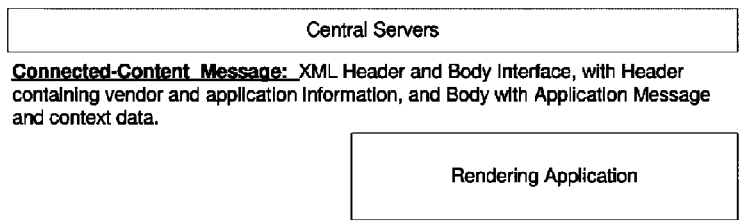

Application Message: Rendering application interface containing content owner, distributor, and respective object IDs and related data

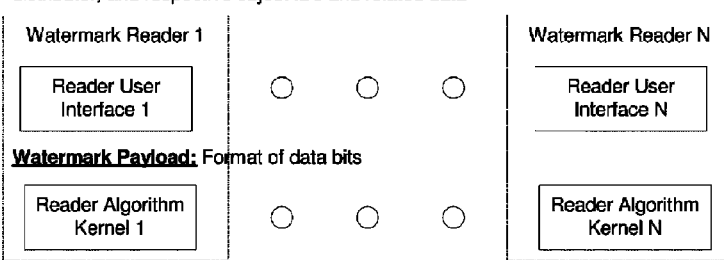

Watermark Payload: Format of data bits

Watermark protocol: Format of embedded bits

PROCESSING AUDIO OR VIDEO CONTENT WITH MULTIPLE WATERMARK LAYERS

CROSS-REFERENCE TO RELATED APPLICATIONS

The present application is a continuation of U.S. application Ser. No. 11/153,520, filed Jun. 14, 2005 (now Pat. No. 7,587,601), which is a continuation of U.S. application Ser. No. 10/017,679, filed Dec. 13, 2001, which claims the benefit of U.S. Provisional Patent Application Nos. 60/256,628, filed Dec. 18, 2000 and 60/336,209, filed Oct. 30, 2001. U.S. application Ser. No. 11/153,520 is also a continuation-in-part of U.S. patent application Ser. No. 09/186,962, filed Nov. 5, 1998 (now Pat. No. 7,171,016), which is a continuation of U.S. application Ser. No. 08/649,419, filed May 16, 1996 (now Pat. No. 5,862,260) and is also a continuation-in-part of U.S. application Ser. No. 08/637,531, filed Apr. 25, 1996 (now U.S. Pat. No. 5,822,436). Each of application Ser. Nos. 11/153,520 (now Pat. No. 7,587,601), 60/256,628, and 60/336,209 are herein incorporated by reference.

The subject matter of the present application is related to that disclosed in application Ser. Nos. 09/571,422, 60/189,246, 60/190,481, 09/597,209 (now U.S. Pat. No. 6,411,725), Ser. No. 09/563,664 (now U.S. Pat. No. 6,505,160), Ser. Nos. 09/660,756, 09/620,019, 09/661,900 (now U.S. Pat. No. 6,674,876), Ser. No. 09/503,881 (now U.S. Pat. No. 6,614,914), Ser. No. 09/452,023 (now U.S. Pat. No. 6,408,082), and laid-open PCT application WO 00/54453. Each of these patent documents is hereby incorporated by reference.

2 INTRODUCTION AND SUMMARY OF THE INVENTION

2.1 Goals

The below-detailed Audio/Video Commerce Application Architectural Framework is an exemplary foundation for a variety of audio and video watermarking applications. These applications may be conceptualized as falling into three classes:

Broadcast monitoring, copyright communication, copy/play control, file verification, and PC connected e-commerce Forensic tracking, content monitoring, and asset management Set-top box connected e-commerce.

Audio/Video commerce applications can further be categorized into one of two categories—Local or Connected. These categories are overlapping because some applications may include aspects of both categories. Local applications, such as copy/play control, need to locally interpret a watermark and apply the desired action (e.g., "Do Not Copy"). Connected applications, such as broadcast monitoring, copyright communication, forensic tracking, content monitoring, asset management, and connected e-commerce, need to connect to a remote entity, e.g., a Central Server and Database, to understand how to fully respond.

This framework does not rely on a particular watermarking technology. Indeed, it is contemplated that different types of watermarks may be applied to different objects. Moreover, object identification may be conveyed by means other than watermark, e.g., header data or separately represented meta data. Standardization of certain of the data thereby conveyed, however, allow the architecture to support a wide variety of systems.

2.2 Terminology

The following section contains definitions of the terms used in this document, and a list of abbreviations.

TABLE 1

2.2.1 Definitions

| Term | Description |
| --- | --- |
| Application Message | The interface defining the message sent from the watermark reader to the rendering application, if one exists, and/or included within the Connected-Content Message. It includes the information from the Watermark Payload and additional related information available from the watermark reader. It is only one component of the Connected-Content Message. |
| Central Database | The database used by a Central Server to identify and to respond to Connected-Content. Note: Often the term is used in the plural because it can refer to several linked and globally located databases. |
| Central Router | The first component of a Central Server that forwards the request to the proper Product Handler, thus increasing the efficiency and modularity of the system. Note: Often the term is used in the plural because it can refer to several linked and globally located routers. |
| Central Server | The central system that handles Connected Applications. It includes two components, a Central Router and a Product Handler. Note: Often the term is used in the plural because it can refer to several linked and globally located servers. |
| Connected Application | Applications that must connect to a Central Server to interpret the data in the watermark. |
| Connected-Content | Content that enables Connected Applications, such as content with a watermark containing a unique identifier. |
| Connected-Content Message | The interface defining the message sent from the watermark reader or separate application to a Central Server. |
| Connected-Content Response | The interface defining the response of a Central Server to the watermark reader or separate application. |
| Content-Owner ID | The unique identification of the content owner. |
| Content-Owner Object ID | The object identifier for a piece of content that is unique for one specific content owner. It can be an audio or video identifier or transaction identifier. It may be interpreted by a Central Server or client server that is identified by the Content-Owner ID. |
| Distributor ID | The unique identification for the distributor, such as a broadcaster or physical store. |
| Distributor Object ID | The object identifier for a piece of content that is unique for one specific distributor. It can be an audio or video identifier or transaction identifier. It may be interpreted by a Central Server or client server that is identified by the Content-Owner ID. |
| Local Application | Applications that know how to interpret the watermark without connecting to a Central Server, such as for copy or play control. |
| Product Handler | The second component of a Central Server that obtains the desired information for the specific connected product. Many times the term is used in the plural because it can refer to several linked but globally located handlers. |
| Standard Interface | The Standard Interface defines standards for the required messages and bit formats in this framework. The Standard Interface inherently defines a standard terminology that aids in conversations, where many times people have similar ideas but are using different terminology. |
| Watermark Payload | The interface defining the format of the data bits, usually including several unique identifiers, which are to be embedded by the watermark. |

TABLE 1-continued 2.2.1 Definitions

| Term | Description |
| --- | --- |
| Watermark Protocol | The interface defining the format of the embedded bits after being processed by the watermark algorithm. The watermarking algorithm is the method in which the Watermark Payload is embedded in the content. It usually includes at least a pseudo-random spreading key and error correction bits. The Watermark Protocol is dependent on the content type, such as audio or video, and its psychophysical characteristics. |

TABLE 2

2.2.2 Abbreviations

| Abbreviation | Term |
| --- | --- |
| AB | AudioBridge (audio counterpart to Digimarc MediaBridge) |
| CCI | Copy Control Information |
| CD | Compact Disc for audio |
| CMC | Copyright and Machine Control |
| CPTWG | DVD Copy Protection Technical Working Groug |
| DHSG | The Data Hiding Sub-Group of the DVD Copy Protection Technical Working Group (CPTWG) |
| DTD | Data Type Definitions |
| DVD | Digital Versatile Disk (DVD-A for audio and DVD video for video) |
| MP3 | A compressed audio format, MPEG 1 Layer 3 |
| OS | Operating System |
| PC | Personal Computer |
| SDMI | Secure Digital Music Initiative |
| STB | Set-Top Box |
| URL | Uniform Resource Locator |
| VB | VideoBridge (video counterpart to Digimarc MediaBridge) |
| WM | Watermark |
| XML | Extensible Markup Language |

2.3 Local Applications

Local applications don't require the application to connect to a Central Server to interpret the watermark. Copy/play control issues, including copy protection and adult filtering, are examples of Local Applications. Without talking with a Central Server, the rendering device (i.e. VCR, DVD, STB, TV) knows whether it can play or record the content based on the watermark.

2.3.1 Framework Focus

Since Local Applications require much less structure than Connected Applications, most of this framework is about Connected Applications. When applicable to Local Applications, this framework includes the ability to enable them.

2.4 Connected Applications

Connected applications are applications that must connect to a Central Server to interpret the data in the watermark. Connected applications include broadcast monitoring, copyright communication, forensic tracking, content monitoring, asset management, and connected-content e-commerce.

The reader may ask, why not embed the link directly as a watermark or metadata? The answer is that it is more flexible to embed an ID, and use a secondary database to link that ID to some external information, such as a URL. The secondary database can easily allow links to be updated and dynamically changed depending on the situation. For example, different links may be provided depending on whether the consumer is using a PC or PDA, or if they are linking from an image on their desktop or within an image editor, such as Adobe Photoshop. In addition, the secondary database can allow information to be displayed without an associated link.

This ID configuration also greatly reduces the number of bits being used. This is critical for watermarks because watermarking is a tradeoff of embedded bit capacity, computational performance, imperceptibility, reliability and robustness. When using non-compliant editors, watermarks stick to the content during format changes or operations, such as open and save, with non-compliant editors. Thus, they are more robust than metadata, and can be used to provide content protection.

In addition, many Local Applications can be enhanced when the system is connected. For example, the Local Application may only know that the content is adult content, but after connecting to a Central Server with a content ID, the server can provide a complete rating scheme.

2.5 DRAWINGS

The present invention will be even more readily appreciated with reference to the following drawings.

FIG. 7 illustrates the standard interfaces with a connected-content response highlighted.

FIG. 8 illustrates the standard interfaces with a connected-content message highlighted.

FIG. 11 illustrates the standard interfaces with a watermark protocol highlighted.

DETAILED DESCRIPTION 2.6 Digimarc Examples

Figure 1:
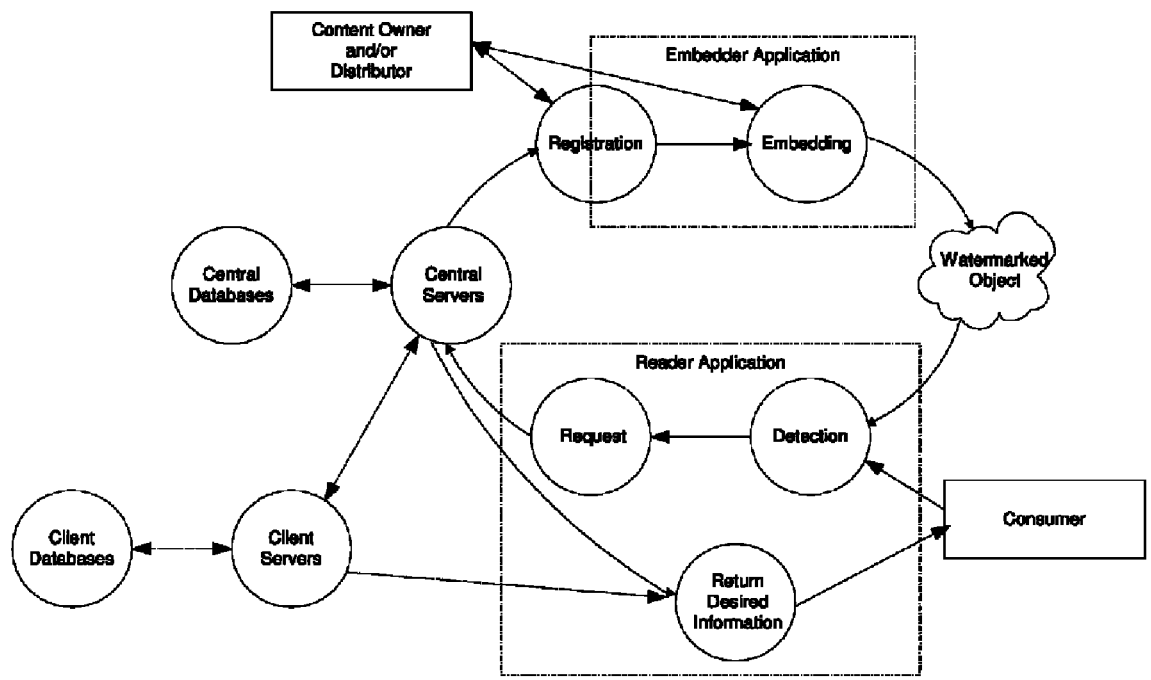
FIG. 1 is a block diagram showing a connected application's system overview.

Currently, Digimarc has two Connected Applications products on the market, Digimarc MediaBridge and Image Commerce.

Digimarc's two Connected Applications (Digimarc MediaBridge and Digimarc Image Commerce) use Digimarc's central system, sometimes called Digimarc Grand Central. Most importantly, this central system is designed to be open, such that other vendors can use the system to link their embedded IDs via their proprietary Product Handlers. In addition, although currently the central Internet server has one location, it can include linked and globally located central systems. (As such, the term "the Central Servers" is used to refer to all of the linked central Internet servers, and the term "a Central Server" is used to refer to one of these central Internet servers. The terms Product Handler, Central Router, and Central Database are used similarly.)

2.6.1 Digimarc MediaBridge

Digimarc MediaBridge currently enables content-providers and owners to embed watermarks into printed media, such as ads, editorial images and packaging. This process enables the consumer to connect directly to the content owner's web page by showing the ad, editorial image or packaging to a standard PC video camera. This web page can be deep inside the content owner's web site. The user can go directly to a specific web page without having to remember a long URL that is printed on the image. In addition, the consumer can be presented with a choice of places to go, including places for unbiased information or to purchase an item.

Other applications for Digimarc MediaBridge allow advertisers to use watermarked ads or coupons to run sweepstakes. If the consumer is required to redeem the coupon, i.e. show it to a PC camera, within the advertiser's store, this application gets consumers into the store with the potential to immediately win merchandise. In addition, the automatic redemption reduces costs of the sweepstakes.

2.6.2 Digimarc Image Commerce

With Digimarc Image Commerce, image owners are provided with content security and Connected Applications. The image owner embeds a registered watermark ID into their image using watermarking plug-ins provided with most standard image editors, such as Adobe Photoshop, Corel Photopaint, and Ulead products, or downloaded from Digimarc's web site. Web crawlers search the web looking for the content owner's watermarked image, and report back the web sites that display the image. If any web sites are not authorized by the content owner to use the images, the content owner is notified of illegal use of their content.

Synergistically, the same watermark ID can link consumers with authorized or non-authorized images to the web site of the content owner to purchase the current image, a high-resolution version, or similar images. Currently, the consumer enables the link by right clicking on the image from their desktop (assuming they have downloaded the ReadMarc v2 plug-in) or from using the plug-ins mentioned above. Soon, the consumer may be able to enable the link from Internet Explorer or Netscape Navigator.

2.7 Connected Application's Concept of Operation

A Connected Application involves two stages, the registration stage and the linking stage. The system overview is shown is FIG. 1.

2.7.1 Registration Stage

The registration stage registers the identifiers for the content and enables the identifier to be embedded into the content. The registration system uses a standard set of APIs.

2.7.2 Linking Stage

The linking stage requires the reader application to send data to a Central Server. This Central Server then accesses a Central Database to obtain the desired information, and then returns the information to the application. This desired information is usually a web address or list of web addresses from which the user may choose one.

A Central Server includes two stages, a Central Router and a Product Handler. This design allows the Central Servers to be more efficient, flexible, and modular. It also allows an open interface for the Central Routers to interact with proprietary Product Handlers.

Figure 2:
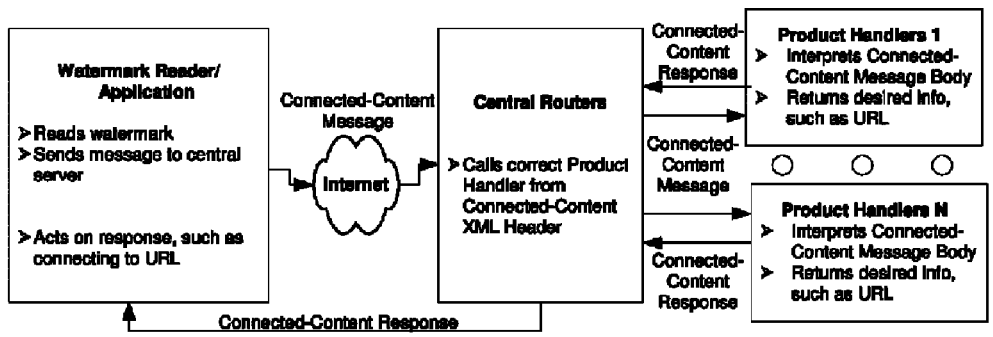
FIG. 2 is a block diagram showing a connected application's linking stage.

A Central Router reads the connected-content XML header and passes the Connected-Content Message to the correct Product Handler. The Product Handler interprets the Connected-Content Message body and returns the desired information, such as a URL, to a Central Router. This Central Router then returns the desired information to the watermark reader or related application. These steps for the linking phase are shown in FIG. 2.

2.8 Standard Interfaces: Linking Stage

Figure 3:
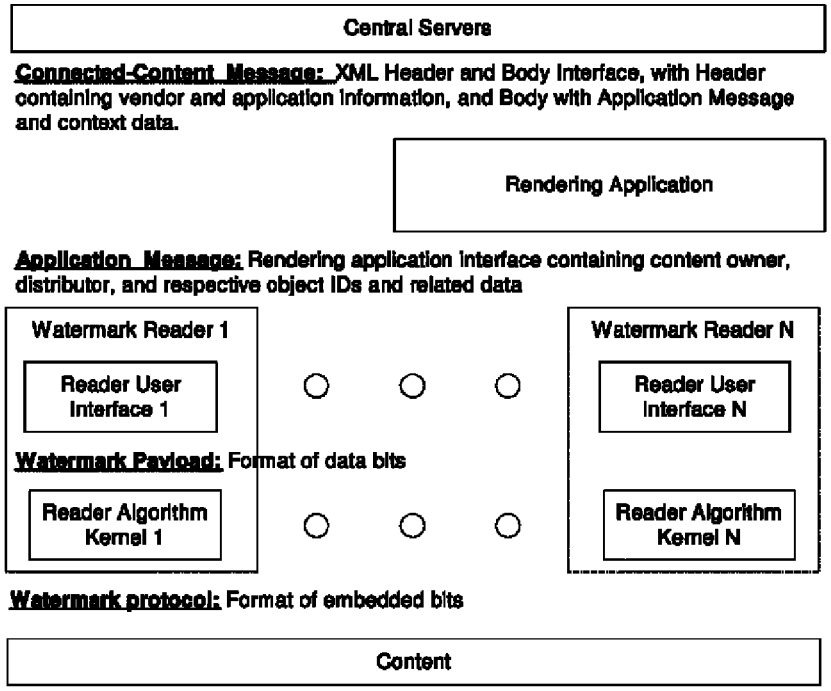
FIG. 3 illustrates standard interfaces for the linking stage.

The Standard Interfaces for the linking stage are shown in FIG. 3. In the diagram, the rendering application refers to a product whose primary function is not reading watermarks. For example, the application could be Real Jukebox or Windows Media Player.

Local control products do not need the Central Servers' layers, but do require the layers between the rendering application and the content. For Connected Applications, there may or may not be an application between the Central Servers and the watermark reader. In other words, the watermark reader may interact directly with a Central Server.

In addition, the application may exist and either forward a Connected-Content Message developed by the watermark reader, or encapsulate the reader's Connected-Content Message within its own Connected-Content Message. This action is acceptable behavior. This behavior allows multiple applications, including a universal reader, to interact with each other and a Central Server.

2.8.1 Standard Terminology

The Standard Interfaces provide a standard terminology to be used in documents and discussions.

The Standard Interfaces include the Connected-Content Response, Connected-Content Message, Application Message, Watermark Payload, and Watermark Protocol.

2.8.2 Standard Interfaces' Information Relationship

Figure 4:
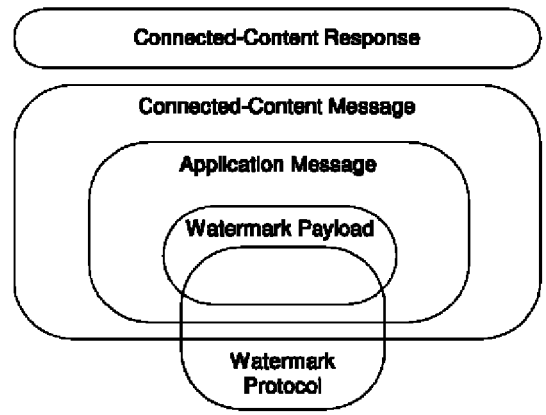
FIG. 4 illustrates a standard interfaces information relationship.

The Standard Interfaces have the following information relationship as shown in FIG. 4.

2.9 Usage Models

2.9.1 Potential Usage Models

This framework allows content to be uniquely identified in one of two ways. The first method is to use a unique object ID:

| Unique Object ID |
| --- |
| X bits |

The second is to use a unique client ID and related object ID, unique only to that client:

| Unique Client ID | Object ID unique only to that Client |
| --- | --- |
| M bits | N bits (usually greater than M bits) |

In either case, note that the object ID can be used to identify the content and/or a transaction.

2.9.2 Digimarc Experience

Currently, Digimarc MediaBridge uses the first method because customers don't want to have any participation in maintaining a Central Database. Thus, when using only a Central Server based system without any client servers, object ID unique for every piece of content is advantageous. Unique object IDs use fewer bits to uniquely identify each printed image, and the Central Database is less likely to have errors because only one ID uniquely identifies a printed image, and if that ID is duplicated, the system knows there is an error.

Digimarc Image Commerce uses the second method. In contrast, many of Digimarc Image Commerce customers want to maintain a local database containing object IDs that relates to their content and/or transactions and is proprietary. Thus, the second method is advantageous for these customers. With this second method, each central sever database includes fewer IDs because the client's database system usually contains object IDs. In addition, the client can then keep the meaning of each object ID private to their system. Finally, the central system can register the object IDs if the client cannot or does not want to use their proprietary system.

2.9.3 Potential Audio/Video Commerce Usage Models

Figure 5:
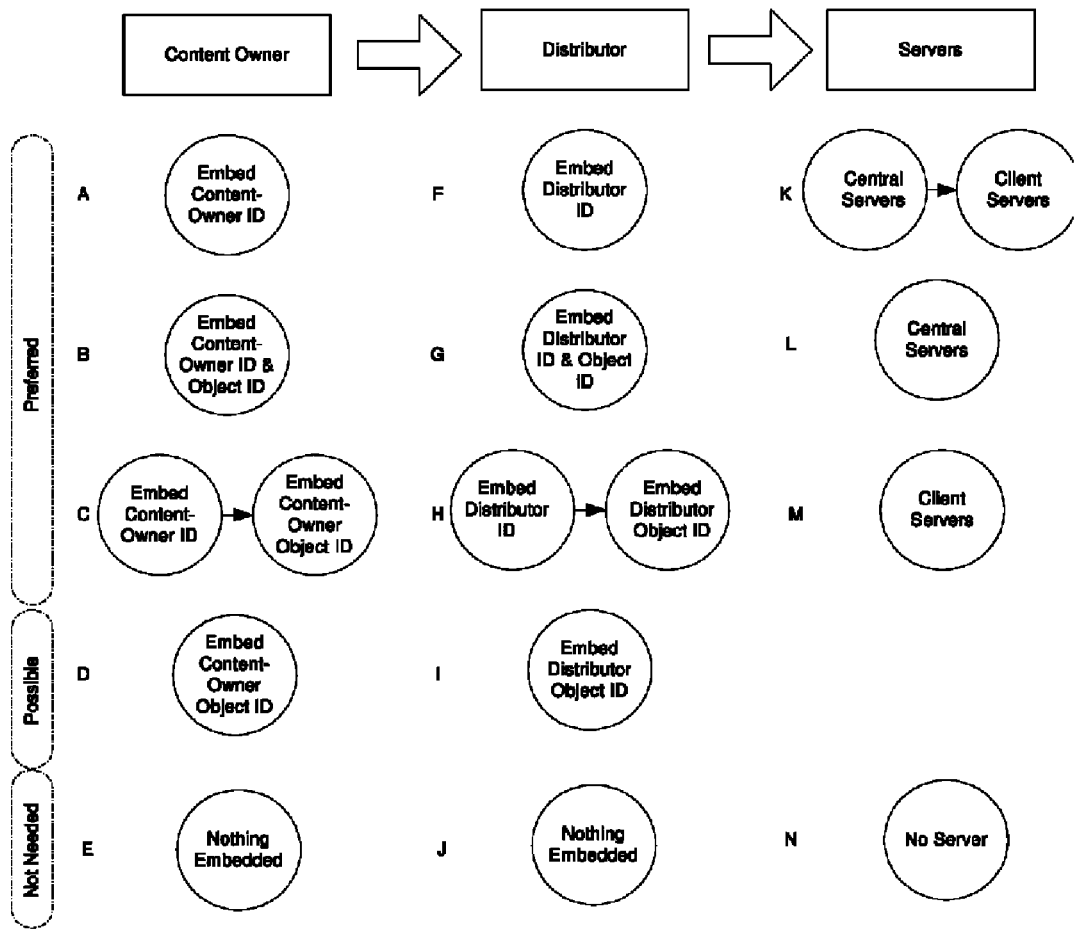
FIG. 5 illustrates potential usage models for audio/video commerce.

Potential audio/video commerce usage models are shown in FIG. 5. In the diagram, any content-owner usage model can be used with any distributor usage model and any server usage model. For example, content owner model A does not to be used with distributor model F and then server model K, but A can be used with H and L. Both methods of uniquely identifying content are enabled.

The differences between content owner usage models B and C is that the Content-Owner ID and Content-Owner Object ID are embedded at the same time in model B and at different times in model C. For example, the Content-Owner Object ID may be embedded at the distributor. The similar difference occurs with Distributor usage models G and H. For example, the Distributor Object ID may be embedded by the set-top box and include a transaction ID that identifies the local broadcaster and end-user (accounting for privacy issues).

2.9.4 Minimal Requirements for Audio/Video Commerce Preferred Usage Models

The preferred usage models of the audio/video commerce watermarking applications have the following minimal requirements, as shown in Table 3 below.

TABLE 3

| Watermarking Application | Content-Owner Usage Model | Distributor Usage Model | Server Usage Model |
|---|---|---|---|
| Class 1 | Uses A, B and C | Not needed | Uses K and L |
| Copyright Communication | A | J (none) | K or L |
| Copy/Play Control | A | J (none) | N (none) |
| File Verification | A | J (none) | N (none) |
| Broadcast monitoring by Content-Owner | B or C | J (none) | L |
| PC Connected e-Commerce by Content-Owner | B or C | J (none) | K or L |
| Class 2 | Uses B and C | Uses G and H | Uses K, L and M |
| Broadcast monitoring by Distributor | E (none) | G or H | L |
| Forensic Tracking by Content-Owner | B or C | J (none) | K or L |
| Forensic Tracking by Distributor | E (none) | G or H | K or L |
| Content Monitoring by Content-Owner | B or C | J (none) | K |
| Content Monitoring by Distributor | E (none) | G or H | K |
| Asset Management by Content-Owner | B or C | J (none) | M |
| Asset Management by Distributor | E (none) | G or H | M |
| PC Connected e-Commerce by Distributor | E (none) | G or H | K or L |
| Class 3 | Uses B and C | Uses G and H | Uses K, L and M |

TABLE 3-continued

| Watermarking Application | Content-Owner Usage Model | Distributor Usage Model | Server Usage Model |
|---|---|---|---|
| STB Connected e-Commerce by Content-Owner | B or C | J (none) | K or L |
| STB Connected e-Commerce by Distributor | E (none) | G or H | K or L |

2.10 Requirements

This section describes the requirements for this framework.

2.10.1 System Requirements

The following bullet points outline preferred requirements for a complete system, independent of watermarking application.

Interfaces are Flexible and Extendable
All Standard Interfaces, including the Connected-Content Response, Connected-Content Message, Application Message, Watermark Payload, and Watermark Protocol, should be easily upgraded to a new version.

Figure 6:
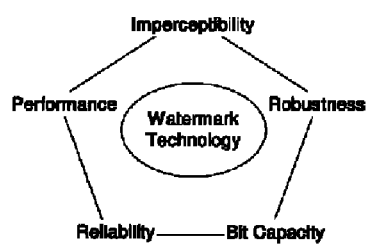
FIG. 6 is a diagram illustrating various watermark tradeoffs.

Optimization of Watermark Bits, Performance, Perceptibility and Robustness
Watermarks are a tradeoff (see FIG. 6) between embedded bit capacity, computational performance, imperceptibility, reliability for false readings, and robustness to malicious or accidental removal. Thus, based on each watermarking application requirements, the system should optimize this tradeoff.

Resistant to Format Changes
The framework should take into account that content can change format. For example, CD or DVD-Audio can be ripped into MP3 or AAC. A movie sound track can also be converted to MP3. Similarly, a video freeze frame can be saved as a still image.

Applicable to Universal Watermark Readers
The system should enable universal watermark reader applications, where universal readers are products that read all watermarks. For example, Real Jukebox may want to read and interact with all audio watermarks. Universal readers can work in two ways:
1. Universal watermark readers that directly interact with a Central Server, even though they may call other watermark readers to read the embedded watermarks.
2. Universal watermarks readers that call additional watermark readers, and these additional watermark readers interact with a Central Server.

Access to Context
The Connected Application should be able to act depending on related circumstances by having access to context data. For example, the Product Handler may want to know if audio came directly from the DVD-A or as a compressed MP3 or SDMI file, such that it can direct the user to e-commerce for the format that he/she prefers. Alternatively, the system may want to know if the consumer is using a PDA or PC, or if the user is within an application or connecting from Window's desktop.

2.10.2 Watermarking Requirements

Table 4 outlines preferred requirements for one embodiment of our watermarking technology. Of course, each application can have additional and more specific requirements based on these general requirements.

TABLE 4

| | Video Requirements |
|---|---|
| Bit rates for Broadcast | Invisible at D1, survive to 1 Mbps |
| Bit rates for Internet | Invisible around 700 kbps, survive |
| D/A | Survive NTSC, PAL, and VHS |
| Frame size | Survive to 360 × 288 |
| Frame rates | Survive rate changes from 25 to 30 |
| Frame dropping | Survive frame dropping of 1 per second |
| Frame scans | Survive Progressive or 2:1 Interlaced |
| Frame aspect | Survive 4:3 or 16:9 |
| Frame Color | Survive (R, G, B), (Y, Cb, Cr) and gray scale |
| Scaling | Survive 0.5 to 2 |
| Rotation | Survive less than 5% |
| Translation | Survives translation |
| Add white noise | Survive when white noise is invisible (around 36 dB SNR) |
| Embed Delay | TBD |
| Read Duration | For many Connected Application the user needs a fast perceived response time, usually around 1 to 2 seconds (see Section 6.4) |
| Reliability | Many applications require low false positive (around 1e−6) and low rate of incorrect payload information (around 1e−6). The exact numbers depend on each specific application |

Preferably, the watermark should survive the following format changes for audio, as shown in Table 5:

TABLE 5

| Codecs | Survive codecs (MP3, AAC, Q-Design, Windows Media Audio, Twin-VQ, ATRAC-3, Dolby Digital AC-3, ePAC) at reasonable quality (i.e. around 64 kbps) |
|---|---|
| D/A | Yes, twice at 22.05 kHz, 16 bit |
| Equalization | Yes, with ±6 dB settings |
| Band-pass filtering | 100 Hz-6 kHz, 12 dB/oct. |
| Linear speed | ±10% |
| Pitch invariant speed change | ±4% |
| Down mixing and surround sound | Stereo to mono, stereo to 6 channel mixing |
| Echo | Maximum delay: 100 ms Feedback coefficient: up to 0.5 |
| Add white noise | Yes, when inaudible (around S/N 36 dB) |
| Sample Rate Conversion | 48 kHz to 44.1 kHz 96 kHz to 48/44.1 kHz |
| Dynamic Range Reduction | Threshold: 50 dB 16 dB max compression |
| Embed Delay | TBD |
| Read Duration | For many Connected Application the user needs a fast perceived response time, usually around 1 to 2 seconds (see Section 6.4) |
| Reliability | Many applications require low false positive (around 1e−6) and low rate of incorrect payload information (around 1e−6). The exact numbers depend on each specific application |

2.11 Document Organization

The framework for a system that meets these requirements is described in detail in the following sections. The document is organized based on the Standard Interfaces defined in FIG. 3, beginning with the top-level Connected-Content Response, moving downwards through the Connected-Content Message, Application Message, Watermark Payload, and ending with the bottom-level Watermark Protocol.

After describing each interface, the document includes a section on standardization for third party vendors. This patent document includes detailed connected-content examples below.

3 CONNECTED-CONTENT RESPONSE

A connected content response is illustrated in FIG. 7.

3.1 Connected-Content Response Overview

The Connected-Content Response is the interface that defines the response of a Central Server to the watermark reader or separate application. The Connected-Content Response interface is simple. It includes a success code and URL or error code and associated text. An example is in Appendix A: Connected-Content Response

3.2 Multiple Links

Multiple link examples are demonstrated in Section 9.3. The multiple links are presented to the consumer for his/her choice after the Connected-Content Message is processed. The list of links could include a link for unbiased information, a link to purchase the product at the users preferred online stores, and a link to the owner's web page.

4 CONNECTED-CONTENT MESSAGE

Standard Interfaces for a connected-content message are illustrated in FIG. 8.

4.1 Connected-Content Message Overview

The Connected-Content Message is the interface that defines the message sent from the watermark reader or separate application to a Central Server. The Connected-Content Message interface includes an XML Header and Body. An example is shown in Appendix B: Connected-Content Message.

4.2 Connected-Content Message XML Header

To enable the Central Servers to work with any vendor's products, the Central Servers use an open interface to receive request packets and to send response to the originating user.

The basics of the open interface are a flexible request and response package structure and a defined connection method based on industry standards.

The XML header is a simple structure that includes the:
Vendor
Application

4.3 Connected-Content Message XML Body

The Connected-Content Message definitions can be divided into the following:
3. Request Code
4. Primary Information
5. Secondary Information Primary and Secondary information may change by request code, but in general conform to the definitions below.

The Request Code instructs the Product Handler to take a specified action. It is mandatory within the Product Information.

The Primary Information portion contains the data required to properly service the request. The Primary Information varies based on the Request Code.

The Secondary Information is intended for aggregate usage monitoring and reporting, engineering analysis.

Personal data about the user may be used for detailed usage monitoring and to obtain user specific connected-content responses. Because Secondary Information may contain private information, the tags and data are only sent if allowed by the consumer. If consumers allow personal data to be gathered, they should receive a benefit for providing this information.

4.3.1 Primary Information

As shown in Table 6, the Primary Information needed currently includes:

TABLE 6

| | |
|---|---|
| Connected-Content Message Type | Used by the Product Handler to modify its actions, typically for backwards compatibility. Potential valid inputs: 1.0 |
| Application Message | Contains all of the necessary watermark details, including Message Type, Watermark Version and unique IDs. Potential valid inputs: Described in Section 5. |
| Content Format | Instructs the Product Handler to return information appropriate for the content format. Potential valid inputs for audio: Wav, AIFF, CD, DVD-A, MP3, AAC, AC3, ePAC, Windows Media Format audio, SDMI, BlueMatter, Mjuice, Qdesign, ATRAC, Twin-VQ, Vorbis, Unknown Potential valid inputs for video: MPEG-1 video, MPEG-2 video, MPEG-4 video, Windows Media Format video, Real, QuickTime, VHS, NTSC, PAL, DVD video, DVB, HDTV, Unknown |
| Context | Instructs the Product Handler to return information appropriate for the context of the situation. Potential valid inputs: Mac PC, Windows PC, PDA, Cellphone, STB, Unknown |
| Environment | Instructs the Product Handler to return information appropriate for the consumer's environment. Potential valid inputs: Windows Desktop, Real Jukebox, Real Player, Windows Media Player, WinAmp, MusicMatch, Liquid Audio Player, Mjuice Player, e-Vue Player, Napster, Unknown |

Other request codes are anticipated. Each will have its own list of mandatory and optional primary information fields. Optional fields are excluded from the primary information when there is no value associated.

4.3.1.1 Aggregate Usage Monitoring

Aggregate usage monitoring is an auto response system. Aggregate usage monitoring does not actually require the sending of personal information. It only requires connected-content messages to be sent without the user's input. As such, aggregate usage monitoring may be an option presented to the consumer, separate from secondary information. Once again, the consumer should receive benefits for allowing this action, and be informed that no personal information is being transmitted. Once again, if this approach is taken, the secondary tags should not even be sent, thus reducing any chance of raising privacy issues.

4.3.2 SECONDARY INFORMATION AND PRIVACY ISSUES

Privacy issues must be considered when sending the secondary information. The user should be asked and should permit the secondary information to be sent, and the user should receive some type of benefit for allowing this data to be collected. The secondary information tags are not sent without user permission.

Secondary Information includes:
User ID
Machine ID

With these two identifiers, a Central Server may determine some of the following:
Preferred spoken language
Input device
Operating system
Country
Sex
Age bracket
Postal code.

These two identifiers allow for the following actions:
Aggregate usage monitoring and reporting
Engineering analysis
Personal data about the user to be used for detailed usage monitoring and user specific connected-content responses.

4.3.3 EXAMPLES

Connected-Content examples are shown in Section 10.

5 APPLICATION MESSAGE

Figure 9:
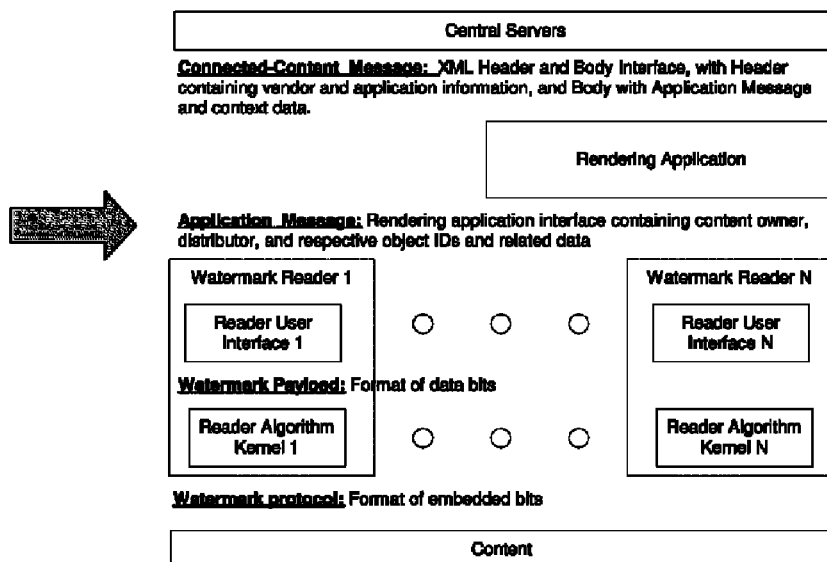
FIG. 9 illustrates the standard interfaces with an application message highlighted.

Standard interfaces for an application message are shown in FIG. 9.

5.1 Application Message Overview

The Application Message is the interface that defines the message sent from the watermark reader to the rendering application, if one exists, and/or included within the Connected-Content Message. It includes the information from the Watermark Payload and additional related information available from the watermark reader. It is only one component of the Connected-Content Message.

The field sizes in the Application Message should be large enough to hold future Watermark Payloads, but small enough that a minimal number of Internet packets need to be sent to a Central Server. In other words, Application Message fields are shells for the Watermark Payload, and all of the bits in the Application Message field are not embedded!

The Application Message interface format is shown below:

| Message Type | Information Bits |
|---|---|
| 16 bits | Undefined |

This format provides maximum flexibility and extensibilities.

5.2 Registering and Reserved Message Types

Third party vendors can register new Application Message type with the Central Servers and Databases and produce proprietary format as long as the format includes an initial 16-bit message type. However, it is optimal if their format can fit into existing types, preferably type 4. Application message types' 128 to 255 are reserved for future uses.

5.3 Application Message Types

Several application message types have been defined. This section describes the Application Message types.

Application Message type 1

This is the simplest interface. It allows the product to format the information bits however it wants, and requires the Product Handler for proper parsing. The usage of this format can be updated without the rendering application being affected—only the watermark reader and Product Handler have to be updated. However, this format does not allow the application to interpret the message locally, thus reducing the copy/play control functionality. This interface is for future watermarking applications.

| Message Type | # of Info Bits | A/V | CMC Bits | Information Bits |
|---|---|---|---|---|
| 16 bits | 16 bits | 1 bit | 31 bits | Undefined |

Application Message types 2 and 3

These interfaces are designed to meet specific needs of the content owners and distributor, respectively. Although these types reduce the chance of incorrect formatting and interpretation, they are less flexible for future uses.

Examples of type 2 applications are: Broadcast Monitoring, Copyright Communication, Copy/Play Control, File Verification, Content Monitoring, Asset Management, Forensic Tracking and Connected e-Commerce.

| Message Type | # of Info Bits | A/V | CMC Bits | WM Version | Content-Owner ID | Content-Owner Object ID |
|---|---|---|---|---|---|---|
| 16 bits | 16 bits | 1 bit | 31 bits | 15 bits | 96 bits | 96 bits |

Examples of type 3 applications are for Distributors using Broadcast Monitoring, Copyright Communication, Copy/Play Control, File Verification, Content Monitoring, Asset Management, Forensic Tracking and Connected e-Commerce.

| Message Type | # of Info Bits | A/V | CMC Bits | WM Version | Distributor ID | Distributor Object ID |
|---|---|---|---|---|---|---|
| 16 bits | 16 bits | 1 bit | 31 bits | 15 bits | 96 bits | 96 bits |

Application Message type 4

This interface is defined to enable all current audio/video commerce watermarking applications and possibly future applications. It also enables potential streaming applications by providing the number of information bits following the message type. The only downside is that systems have to be aware that IDs equal to 0 mean the field is not being used, i.e. not valid. The CMC bits are designed to indicate whether the bits are used, possibly with a value of 0, or not used. For all these reasons, Application Message type 4 is the preferred type since it can accommodate all watermarking applications and clients. Type 4 applications include all Audio/Video Commerce Watermarking Applications.

| Message Type | # of Info Bits | A/V | CMC Bits | Content-Owner WM Version | Content-Owner ID | Content-Owner Object ID | Distributor WM Version | Distributor ID | Distributor Object ID | Misc Info |
|---|---|---|---|---|---|---|---|---|---|---|
| 16 bits | 16 bits | 1 bit | 31 bits | 8 bits | 96 bits | 96 bits | 8 bits | 96 bits | 96 bits | 96 bits |

Application Message type 5

This interface is compliant with the proposed European Broadcast Union (EBU) system. It demonstrates how easy this framework adapts to other systems. This is one example of a message type that is compliant, and many others could easily be designed and registered, or this message type can be changed if the EBU changes its format. Refer to Section 6.6 for a detailed demonstration.

| Message Type | # of Info Bits | A/V | CMC Bits | W1 Ownership | W2 Contribution Protection | W3 End user Fingerprint |
|---|---|---|---|---|---|---|
| 16 bits | 16 bits | 1 bit | 31 bits | 64 bits | 64 bits | 64 bits |

All Application Message types include CMC bits for local copy control as well as connected copyright issues. Although it is expected that local copy control issues will be handled by a special copy control watermark, these CMC bits are optional and extend beyond DVD CPTWG or SDMI copy control. The adult bit is used to identify, and filter (if desired) adult content. Finally, copy protection and connected applications may merge in the future; thus, we have defined types to enable this merger.

5.4 Definition of Application Message Fields

The definition of each section is as follows:

TABLE 7

| | |
|---|---|
| Message Type | The Application Message type |
| # of Info Bits | Number of information bits (not including Message Type or itself) = 528 |
| A/V | Audio (=0) or Video (=1) |
| CMC Bits | Copyright and Machine Control (CMC) bits |
| WM Version | Watermark Payload Version (enables re-use of IDs in each version) May be different for content-owner and distributor |
| Content-Owner ID | An unique identifier for the content owner |
| Content-Owner Object ID | An identifier for the content, unique to only the specific content owner. May include transaction information. |
| Distributor ID | An unique identifier for the distributor |
| Distributor Object ID | An identifier for the content, unique to only the specific distributor. May include transaction information. |
| Misc Info | Bits for future uses |

The CMC bits for type 2 are defined as follows.

TABLE 8

| | |
|---|---|
| Bits 0 | CCI valid |
| Bits 1-2 | Copy Control Information (CCI) as defined by DVD DHSG and SDMI |
| Bit 3 | All International Copyright Law Protection claimed |
| Bit 4 | Adult Content valid |
| Bit 5 | Adult content - more online information may be available associated with this ID |
| Bit 6 | Advanced Ratings valid[2] |
| Bit 7-9 | Advanced Ratings (G = 0, PG = 1, PG-13 = 2, R = 3, NCR-17 = 4, X = 5, XXX = 6) |
| Bit 10-31 | Reserved for future use |

A C language implementation is shown in Appendix C: Example Application Message C-Class.

5.5 Uniqueness of IDs

Content-Owner IDs and Distributor IDs are globally unique. Third party vendors may be required to use these IDs; thus, they will be unique across third party vendors.

In the preferred usage models, the object IDs are not globally unique, but unique to each client ID (i.e. Content-Owner ID or Distributor ID). This usage model is advantageous because fewer bits have to be embedded than needed if object IDs were globally unique. This model also enables the central servers to forward the information to client servers, which can interpret the object IDs, with only the registration of the client ID.

The disadvantage is that content is uniquely identified by a pair of IDs rather than with one ID. As long as applications are aware and respect this fact, this disadvantage is minimal.

By including the Watermark Payload version in the Application Message, this framework enables the choice of re-using object IDs or not when a new Watermark Payload version is implemented. A new Watermark Payload version probably means that a new Watermark Protocol has been developed. This Watermark Protocol is more robust with higher embedded bit capacities. At that time, the choice between re-using object IDs or not can be made depending on how much the new bit capacities have increased.

More object IDs are available if object IDs are re-used. The disadvantage is that the content is uniquely identified by more than one ID and now requires the inclusion of a Watermark Payload version. Once again, as long as applications are aware and respect this fact, this disadvantage is minimal.

Along the same lines, object IDs for audio and video don't have to be different. However, since video can be captured frame-by-frame as images, images should use a different Watermark Protocol than video frames. If they ever use the same protocol, images and videos should make sure their IDs never match, i.e. remain unique. This is not advisable since it would be difficult to manage, and require large payloads.

5.5.1.1 Standardization: Specs for Third Party Vendors

As mentioned above, third party vendors should use global Content-Owner IDs and Distributor IDs. As such, the system will make sure that content owners only have one ID across all vendors. This means that if the vendor is using a proprietary registration handler, the Central Systems will have to handle the Content-Owner ID registrations.

5.6 Public or Private Object ID

Object IDs can identify the content, the content and its format, and/or a transaction, such as a sale of to the content. These object IDs can be interpreted by a Central Server (a.k.a. public) or a client server (a.k.a. private). Thus, a private object ID does not mean that the ID cannot be read, but that the central or public system does not know how to interpret the ID, and should forward it to one of the client's servers.

6 WATERMARK PAYLOAD

Figure 10:
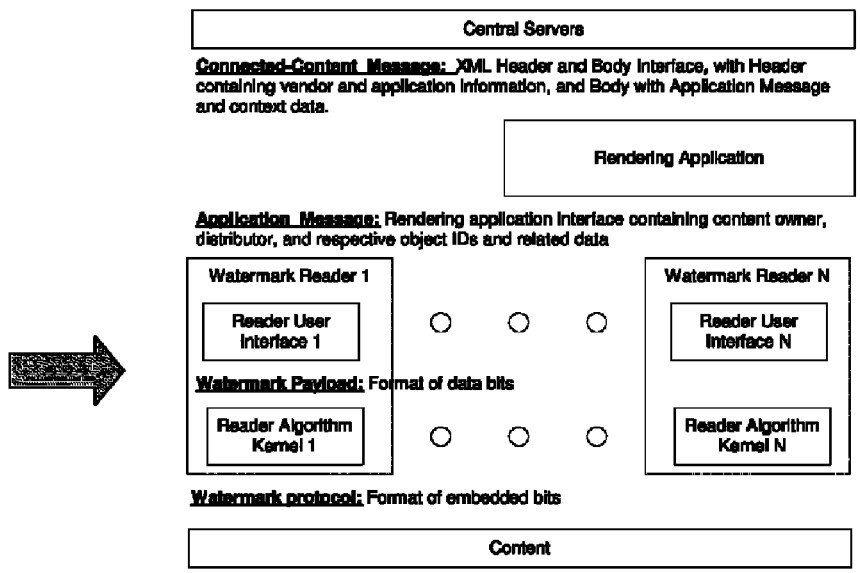
FIG. 10 illustrates the standard interfaces with a watermark payload highlighted.

FIG. 10 illustrates standard interfaces for a watermark payload.

6.1 Watermark Payload Overview

The Watermark Payload is the interface that defines the format of the data bits. This usually includes several unique identifiers, which are to be embedded by the watermark. The Watermark Payload interface includes the format of the bits. It is an internal format to the watermark reader, and highly related to the watermark protocol.

6.2 Watermark Protocols and Watermark Payload Versions and Types

Watermark Payload versions and types are not explicitly embedded in the Watermark Payload, but are determined from the Watermark Protocols used for each Watermark Payload type. In other words, if the watermark reader can detect the watermark, the reader knows the protocol and, thus, implicitly knows the type. From the Watermark Payload type, the version is known, since each type is specific to one Watermark Payload version.

This payload configuration reduces the number of bits to be embedded. Even if payload bits were used to embed the type and version, the protocol would probably need to be changed because the new type would most likely include a different number of embedded bits. This would inherently change the protocol. Similarly, a new version is only defined when there is a new protocol. In addition, this payload configuration offers a lot of flexibility for the system to keep client IDs, even identical IDs, separate across different Watermark Protocols.

To this end, the Watermark Payload version is part of the Application Message as fully described in Section 5.5. The Watermark Payload type determines in which fields of the Application Message to store the payload.

6.3 Copy Control Information (CCI)

The Watermark Payload version 1 does not explicitly include CCI bits. The CCI bits (stored in the CMC part of the Application Message) can be determined by the reader from the usage of a specific watermark protocol.

For DVD video content, the CCI bits will be determined from the presence of the watermark and, possibly, an associated wobble track payload. The presence of the watermark identifies that the content is protected (i.e. robust watermark). The presence of the wobble track means that the content has not been copied, and its absence means the content has been copied (i.e. fragile watermark). The connected-content watermark reader may not be allowed to read a Millennium watermark, and, in that case the CCI bits will be left as 0s (where the CCI valid bit—CMC bit 0—is left as 0).

However, for non-DVD video and non-DVD or SDMI audio content, the presence of a specific Watermark Protocol can identify the content as protected. In other words, one Watermark Protocol is used to embed the Content-Owner Object ID for non-copy protected content and another is used for copy protected content[3]. In the future, a fragile watermark can be added for copy-once (i.e. one generation) capabilities, if desirable. The presence of the watermark can be determined in hardware, without reading the payload bits, thus reducing the cost of the copy control hardware. Then, the Watermark Payload can be read in software, where the Connected Application can be applied.

6.4 Watermark Payload Types for Audio/Video Commerce

Watermark Payload Type 1:

| Adult Content (CMC bit 5) | Content-Owner ID |
|---|---|
| 1 bit | 20 bits (1 million content-owners) |

6.4.1 Watermark Payload Type 2:

| Content-Owner Object ID |
|---|
| 30 bits (1 billion objects) |

6.4.2 Watermark Payload Type 3

| Adult Content (CMC bit 5) | Distributor ID |
|---|---|
| 1 bit | 20 bits (1 million content-owners) |

6.4.3 Watermark Payload Type 4

| Distributor Object ID |
|---|
| 30 bits (1 billion objects) |

6.5 Watermarking Types for Watermarking Applications

TABLE 8

| Watermarking Application | Watermark Payload Types |
|---|---|
| Class 1 | Uses 1 and 2 |
| Copyright Communication | 1 |
| Copy/Play Control | 1 |
| File Verification | 1 |
| Broadcast monitoring by Content-Owner | 1 and 2 |
| PC Connected e-Commerce by Content-Owner | 1 and 2 |
| Class 2 | Uses 1, 2, 3 and 4 |
| Broadcast monitoring by Distributor | 3 and 4 |
| Forensic Tracking by Content-Owner | 1 and 2 |
| Forensic Tracking by Distributor | 3 and 4 |
| Content Monitoring by Content-Owner | 1 and 2 |
| Content Monitoring by Distributor | 3 and 4 |
| Asset Management by Content-Owner | 1 and 2 |
| Asset Management by Distributor | 3 and 4 |
| PC Connected e-Commerce by Distributor | 3 and 4 |
| Class 3 | Uses 1, 2, 3 and 4 |
| STB Connected e-Commerce by Content-Owner | 1 and 2 |
| STB Connected e-Commerce by Distributor | 3 and 4 |

6.6 Watermark Payload Types for EBU

This section discusses defining Watermark Payloads that are EBU compliant. The next section discusses the differences between the EBU Watermark Payloads and other payloads contemplated herein. The data is from the EBU specs document N/WTM 031, Geneva, 22 Oct. 1999, "EBU NWTM0311.doc".

6.6.1 Watermark Payload Type 5: W1 Ownership

| Intern. Org. | Local Agency | Numbering Data |
|---|---|---|
| 8 bit | 15 bit | 41 bit (2199 Billion) |

Intern. Org Identification of the International Organization that standardizes the description of the content of the database. A maximum of 255 International Organization will be recognized.
Local Agency Identification of the Local Agency that is authorized by the International Organization to distribute identifier (pointer). One International Organization will authorize a maximum of 32,768 Local Agencies.
Numbering Data Identification number itself. 2199 billions of works identified by one Local Agency.

6.6.2 Watermark Payload Type 6: W2 Contribution Protection

| GM | DM | $I_dBr$ | $I_dBo$ | Data |
|---|---|---|---|---|
| 2 bit | 2 bit | 20 bit | 20 bit | 20 bit |

GM Generation Management
DM Data Management
$I_dBr$ Identity code of local broadcaster who receives the pictures at the output of the network (1 million)
$I_dBo$ Identity code of the broadcaster who supplies the pictures at the input of the network. The identity code should be the same as IdBr. (1 million).

6.6.3 Watermark Payload Type 7: W3 End User Anti-Piracy (Fingerprint)

| Data (not yet defined - could be PIN) |
|---|
| 64 bits |

6.7 Discussion of EBU System

This framework enables EBU compliant systems with the definitions of Application Message type 5 and the Watermark Payload types 5, 6 and 7 (6.6). However, the preferred Watermark Message type 4 and Watermark Payload types 1 through 4 are not EBU compliant.

The first layer of the EBU system requires 64 embedded bits and locks the system to 32 k local agencies. The framework detailed herein defines a different lower level Watermark Payload and Protocol that can handle all of the requirements of the EBU with the advantage of allowing 1 million client systems to be linked and only requires 51 bits to be embedded.

In addition, the complete EBU system requires 192 embedded bits to handle ownership, distribution and end-user fingerprinting. The present system, in contrast, can enable these requirements with 102 embedded bits, and be more flexible in enabling linking to one million content-owner and one million distributor systems, or using a central system.

6.8 Public Payloads

This section describes a public payload structure for use in audio or video digital watermarking systems. One suitable system is the Philips Watercast™ video watermarking system, which is used by way of example in some of the following sub-sections. (Additional background information about the WaterCast system is available from Philips.). Of course, other watermarking systems will equally benefit from our inventive layering and payload message types discussed herein. Indeed, any watermarking based system that envisions content being handled by multiple parties, or envisions a need for content identification will benefit from our inventive techniques.

In one embodiment of this aspect of the present invention, our inventive payload structure is used in connection with a watermark-based broadcast monitoring system (audio or video). Two general requirements of broadcast monitoring are to 1) embed and read a unique payload at set intervals (e.g., 0.01 seconds, 1 second, 5 seconds, etc.), and 2) prevent a first party from reading (or decoding) a second party's watermark.

Other environments benefiting from our inventive payload structure include rights management, forensic tracking, data management and enhanced content, to name just a few.

Our payload structure can be used in both a public key and private key system (defined below). In our preferred embodiments, the inventive payload structure and/or layering is used with a centralized router and database, e.g., to facilitate video/audio watermark ID registration and reporting.

6.8.1 DEFINITIONS

Private Key System
  A Private Key System is a watermarking system where a watermark detector requires a private key used by the watermark embedder in order to detect and read a watermark payload.
Public Key System
  A Public Key System is a watermarking system where a watermark detector requires a public key to detect and read the watermark payload. The term "public key" as is used in this section (6.8+) should not be confused with public key infrastructure cryptology.
Payload
  A payload is a format or collection of digital watermark data bits. A payload can optionally carry several unique identifiers.
Content ID
  A content ID is a number or identifier that uniquely identifies an item of content. Content items include audio and video, although the concepts in this section can be extended to images and other data. Preferably, the content owner's name is maintained in a related database under, e.g., a Content ID database entry.
Distributor ID
  A distributor ID is a number or identifier that uniquely identifies a distributor, such as the content aggregator (including Networks) or service provider for broadcast video, as well as distributor or retailer for recorded media.

6.8.1.1 Watermarking Applications and Watermark Payload

The following ten (10) underlined sections (e.g., "Copyright Communication") define various watermarking applications, related watermark payload, and database requirements.

Copyright Communication
  Application: Communicate and link to copyright information
  Watermark Payload: Content ID
  Database: Relate content ID to content owner
Copy Protection
  Application: Identifies whether content can be copied
  Watermark Payload: CCI bits
  Database: N/A
Broadcast Monitoring
  Application: Content owner or distributor can track use of their content
  Watermark Payload: Content ID, and possibly Distributor ID and time information
  Database: Links content ID to content owner and distributor ID to content aggregator (including Networks) or service provider for broadcast video, as well as distributor or retailer for recorded media.
Internet Monitoring
  Application: Content owner or distributor can track use of their content over the Internet
  Watermark Payload: Content ID
  Database: Links content ID to content owner Content Filtering
　　Application: Content can be identified and classified
　　Watermark Payload: Content ID or Classification code
　　Database: If using content ID, database must contain classification codes
Forensic Tracking
　　Application: Locates the source of content
　　Watermark Payload: Forensic database owner ID and Forensic ID, such as account or smart-card ID
　　Database: Private database linking forensic ID to a person
Authentication
　　Application: Identifies if original content has been altered
　　Watermark Payload: Presence (fragile watermark) and/or continuity of (robust) watermark guarantees unaltered content
　　Database: N/A
Asset Management
　　Application: Connecting content outside the Asset Management System back to the Asset Management System
　　Watermark Payload: Content ID, and possibly Distributor ID
　　Database: Content ID linked to content owner, Distributor ID linked to asset management system
Rights Management
　　Application: Connecting content outside the DRM back to the DRM and links to contents usage rules and billing information
　　Watermark Payload: Content ID, and possibly Distributor ID
　　Database: Content ID linked to content owner, usage rules, and billing information, Distributor ID linked to method of distribution
Content-as-Portal e-Commerce
　　Application: Delivers targeted communications and information across the internet associated with content being consumed
　　Watermark Payload: Content ID, and possibly Distributor ID Database: Content ID linked to content owner and related content and information,
　　Distributor ID linked to method of distribution

6.8.2 Payload Structure

Our payload structure as described herein has been designed for flexibility. A preferable environment for our payload is an architecture that includes unique content IDs, such that a central router knows a content owner's name (or other identifier, such as an account) and/or knows an IP address to link to a database (e.g., a central or distributed database) to retrieve the content owner's name or other information. This architecture allows content owners to exchange content with minimal changes to the system and no changes to the watermark payload. Our payload works well with an architecture based upon unique content identifiers (e.g., a "Content ID") such that a central router knows the content owner's name and/or IP address to link to a distributed private database. This architecture allows content owners to buy and sell content with minimal changes to the system and no changes to the watermark payload.

One design consideration is capacity of the watermark. In a time-independent mode, a watermark system typically embeds a watermark with a payload in the range of 2-256 range. Most preferably, the payload is in a range of 16-72 bits. (We note that the WaterCast system currently envisions multi-sized payloads, such as 36 and 72-bit payloads.). Choosing, for example, a 36-bit payload allows layering multiple watermarks (or watermark messages) in the same video frame (or audio segment). Layering multiple watermarks as such in a broadcast monitoring environment allows different broadcasters to watermark their content, even if the content has been previously watermarked, without compromising the quality of the content. Similarly, distributors can watermark content that they receive from content owners.

6.8.3. Payload Modes

Our payload structure accommodates systems using multiple modes or structures. For example, consider a system that has both a time dependent and time independent mode, each discussed below. Which mode is used can be based upon the needs of the particular application or operating environment, and/or how the content will be watermarked downstream. The payload modes are preferably determined in advance of the watermarking process and a watermark embedder and detector can be manually (or automatically) configured to correct the payload mode.

6.8.3.1 Time Dependent Mode

The time dependent mode is useful for applications where a date/timestamp (DTS) sufficiently identifies content, along with minimal identifiers such as an embedder identifier or a distribution channel ID. (In a preferred embodiment, the DTS is automatically updated at a predetermined time interval (e.g., every 1 second, etc.) by the embedder once the embedding process starts.). An example payload structure, e.g., for a 36-bit time dependent mode, uses a 12-bit DTS field and a 24-bit identifier field. Of course, the bit-size can be varied according to different payload capacity and/or to accommodate other payload fields, etc.

6.8.3.2 Time Independent Mode

The time independent mode is used when there is either no need for a DTS or the payload is periodically changing. This mode is particularly useful when the payload contains a content ID and distributor ID in the same watermark. The embedding platform has complete control of the embedding system in this case.

6.8.4 Payload Layering

Multiple layers can be embedded in content, preferably with non-objectionable quality degradation. It should be appreciated that the term "layer" refers to a watermarking protocol or format (discussed below). The term "layer" may alternatively refer to an embedding session, process, or payload structure. In one embodiment, a "message type" (discussed below) is used as a layer or as a layer component. Consider an example where up to four (4) layers are embedded in a content item. For example, a message type 0 may be embedded by a content owner as layer 0 to identify the content, and a message type 1 can be embedded by a content distributor as layer 1 to identify the distributor. Layer 1 is typically embedded at a later time, and perhaps with a different protocol, than layer 0. Layers can also include usage rules to regulate usage of the content. In a four-layer example, one layer can include usage rules for the content. Or in an eight-layer example, perhaps two or more layers carry usage rules. The number of layers used in these examples is for illustrative purposes only. The number of layer and the layers carrying usage rules may vary. Of course, the upper limit of layers that can be embedded in an item of content may be bounded by visibility or degradation considerations.

6.8.4.1 Layering and Public Keys

The number of public keys used with an item of content preferably corresponds to the number of layers embedded in the content. For example, in a four-layer example, there are preferably four corresponding public keys. Preferably, the four keys are unique and standardized as layers 1, 2, 3 and 4. An adult key (or bits) can be added to a layer for additional screening and content control. For example, consider the following:

Public Key Layer 1
    Public Key Layer 1 Adult Content
Public Key Layer 2
Public Key Layer 3
Public Key Layer 4

6.8.5 Relationship With Private Key Systems

The privacy aspect of a private key system can be accomplished with this public key system via a "Privacy Code." For example, when considering the WaterCast system, the system's watermark detector will only output the payload for this layer if it has been enabled with the Privacy Code, found in message types 8 to 12 below (section 6.8.6+). If the detector is not enabled to read the watermark, the output of the detector gives no indication that a watermark was found.

Several advantages of using a Privacy Code are as follows:
1. In order to obtain information protected by the Privacy Code, the code itself will need to be compromised and used in a pirate detector.
2. Even if the information contained in the payload is compromised, the related database that acts on the payload can be designed to require authentication before acting upon the payload.
3. Encryption is not used since it would change the payload to a different, but identical, payload each time. A method to overcome this limitation is to use a time-based encryption scheme. The scheme can be rather expensive to implement.

6.8.6 Payload Message Types

For the following discussion, a payload message is assumed to include between one (1) and four (4), 36-bit packets. (It should be appreciated, however, that the number of bits, packets, etc. could vary without deviating from the scope of the present invention. Hence, the following discussion is given by way of example.). Each payload message is identified as one of many different message types. Each unique message type includes different information, based on the requirements of individual applications. For example, if there is a requirement that an identifier be detected each and every second, message type 0 can be used to carry this identifier. But if a content ID and a distributor ID are needed, for example, then a message type 2 can be used. The number of message types can vary according to the watermark system. Preferably, a system includes enough message types to provide system flexibility and versatility.

6.8.6.1 Packet Format and Message Types

In our continuing example, each packet includes 36-bits. The first packet segment, e.g., the first 6-bits, forms the message type and sequence number of the packet. The remaining number of bits forms the message (or data) payload. Of course, the number of bits per segment is varied in other embodiments. For example, a packet may include 16, 48, 72, 144 or 256 bits, etc., where the respective number of bits is variously allocated to the message type, sequence number and data payload.

A generic format for a 36-bit packet is:

| Message type | Sequence bits | Data Payload |
|---|---|---|
| 4 bits | 2 bits | 30 bits |

Specific message types are discussed below. Different message types can be layered on top of each other, to provide additional information, especially when this information is to be embedded at a different time and/or location. The number of layer per content item can vary as discussed above. In addition, the sequence bits allow the detector to know the format of the data payload after its first second of detection. As such, if a message type has 3 packets, the detector can detect it in, e.g., 3 seconds (e.g., in the WaterCast system) as opposed to having to wait until the first packet is identified and start from there—which would have taken, on average, 4.5 seconds, if used.

Message Type 0: Content ID

Message Type 0 is used in those instances where an ID needs to be detected at given intervals, e.g., once every 0.5, 1, 3, 5, etc. seconds, and where the content needs to be uniquely identified independent of a broadcaster, distributor, content owner or service provider. Typically, watermark message detection/decoding takes a finite amount of processing time. For example, a message may take a minimum of 0.025 seconds, 0.5 seconds or 1 second, etc. (In the Watercast system, for example, we understand that detection of this watermark message type should take about 1 second.). The detection interval should be set to allow sufficient detection time.

| Message type | Sequence bits | Content ID |
|---|---|---|
| 0000 | 00 | 30 bits |

Message Type 1: Distributor ID

Message Type 1 is preferably used to uniquely identify a distributor content, but when the distributor ID cannot be added at the same time or location as the Content ID. The Distributor ID can refer to the content aggregator (including Networks) or service provider for broadcast video, as well as distributor and retailer for recorded media. This message type can be added as an additional layer and, optionally, in conjunction with Message Type 0. (In the WaterCast system, for example, we understand that detection of this watermark message type should take about 1 second.).

| Message type | Sequence bits | Distributor ID |
|---|---|---|
| 0001 | 00 | 30 bits |

Message Type 2: Content and Distributor ID

Message Type 2 is used when the distributor needs to be identified and an ID registered by the content owner is used to identify the content, but where time is not necessarily of the essence and utilizing the watermarking layers for future use may be required. Both Content and Distributor ID can be embedded at the same time and location. Message Type 2 requires additional processing time due to the dual sequence processing. (We understand that the detection time needed by the WaterCast system for this message should be about 2 seconds.).

| Message type | Sequence bits | Content ID |
| --- | --- | --- |
| 0010 | 00 | 30 bits |
| Message type | Sequence bits | Distributor ID |
| 0010 | 01 | 30 bits |

Message Type 3: Content ID with DTS

Message Type 3 is used for broadcast monitoring where a Distributor ID is not needed. Message Type 3 should be used when there is a need for minimizing the use of layers for later watermarking activates. (We understand that the detection time needed by the WaterCast system for this message should be about 2 seconds.). This message type must be created by an embedding platform application since it cannot be used with WaterCast in the time dependent mode. In addition, one-second accuracy can be obtained by checking that a content ID is read in between each DTS payload.

| Message type | Sequence bits | Content ID |
| --- | --- | --- |
| 0011 | 00 | 30 bits |
| Message type | Sequence bits | Embedding DTS |
| 0011 | 01 | 30 bits |

Message Type 4: Distributor ID with DTS

Message Type 4 is preferably used for broadcast monitoring where the Content ID is not needed. This message type should be used when there is a need for minimizing the use of layers for later watermarking activates. This watermark requires a minimum of 2 seconds for detection. The embedding platform application can create this message type. (In the WaterCast system, this message type is preferably not used the time dependent mode. In addition, one-second accuracy can be obtained by checking that a content ID is read in between each DTS payload.). The message type can be used in the case where a broadcaster has several outbound feeds that require a DTS associated with each feed. In this case the Distributor ID can be the unique identifier for that feed.

| Message type | Sequence bits | Distributor ID |
| --- | --- | --- |
| 0100 | 00 | 30 bits |
| Message type | Sequence bits | Embedding DTS |
| 0100 | 01 | 30 bits |

Message Type 5: Content and Distributor ID with DTS

Message Type 5 is used for broadcast monitoring where, not only is the Content ID needed, but also the out-bound feed, e.g., distributor ID, of the content is needed. This message type should be used when there is a need for minimizing the use of layers for later watermarking activates. (We understand that for use in the WaterCast system, this watermark message type requires about 3 seconds for detection. This message type is preferably created by the embedding platform application since it cannot be used with WaterCast in the time dependent mode. In addition, one-second accuracy can be obtained by checking that a content ID is read in between each DTS payload.).

| Message type | Sequence bits | Content ID |
| --- | --- | --- |
| 0101 | 00 | 30 bits |
| Message type | Sequence bits | Distributor ID |
| 0101 | 01 | 30 bits |
| Message type | Sequence bits | Embedding DTS |
| 0101 | 10 | 30 bits |

Message Type 6: Distributor to Distributor ID

Message Type 6 is used to represent two distributors, one who is sending the content and another who is receiving the content. For example, the first distributor can be the content aggregator and the second distributor could be a service provider. (We understand that in the WaterCast system, Message Type 6 requires about 2 seconds to detect, but only uses one layer as opposed to using two layers of message type 1.).

| Message type | Sequence bits | Distributor ID (from) |
| --- | --- | --- |
| 0110 | 00 | 30 bits |
| Message type | Sequence bits | Distributor ID (to) |
| 0110 | 01 | 30 bits |

Message Type 7: Private Content ID

Message Type 7 is preferably used to keep the Content ID private. (In a WaterCast environment, this watermark message type takes about 2 seconds to detect. As described above, the WaterCast detector will only output this Content ID if the detector is allowed to detect this ID by knowing the Privacy Code. If the detector is not enabled to read the watermark, the output of the detector gives no indication that a watermark was found.).

| Message type | Sequence bits | Content ID |
| --- | --- | --- |
| 0111 | 00 | 30 bits |
| Message type | Sequence bits | Privacy Code |
| 0111 | 01 | 30 bits |

Message Type 8: Private Distributor ID

Message Type 8 is used to keep the Distributor ID private. (In a WaterCast environment, this watermark message type takes about 2 seconds to detect.).

| Message type | Sequence bits | Distributor ID |
| --- | --- | --- |
| 1000 | 00 | 30 bits |
| Message type | Sequence bits | Privacy Code |
| 1000 | 01 | 30 bits |

Message Type 9: Private Content and Distributor ID

Message Type 9 is used to keep the Content ID and Distributor ID private. (In a WaterCast environment, this watermark message type takes about 3 seconds to detect.).

| Message type | Sequence bits | Content ID |
|---|---|---|
| 1001 | 00 | 30 bits |
| Message type | Sequence bits | Distributor ID |
| 1001 | 01 | 30 bits |
| Message type | Sequence bits | Privacy Code |
| 1001 | 10 | 30 bits |

Message Type 10: Private Content ID with DTS

Message Type 10 is used to keep the Content ID and DTS private. (In a WaterCast environment, this watermark message type takes about 3 seconds to detect. However, one-second accuracy can be obtained by checking that a content ID and Privacy Code is read in between each DTS payload.).

| Message type | Sequence bits | Content ID |
|---|---|---|
| 1010 | 00 | 30 bits |
| Message type | Sequence bits | Embedding DTS |
| 1010 | 01 | 30 bits |
| Message type | Sequence bits | Privacy Code |
| 1010 | 10 | 30 bits |

Message Type 11: Private Distributor ID with DTS

Message Type 11 is used to keep the Distributor ID and DTS private. (In a WaterCast environment, this watermark message type takes about 3 seconds to detect. However, one-second accuracy can be obtained by checking that a distributor ID and Privacy Code is read in between each DTS payload.).

| Message type | Sequence bits | Distributor ID |
|---|---|---|
| 1011 | 00 | 30 bits |
| Message type | Sequence bits | Embedding DTS |
| 1011 | 01 | 30 bits |
| Message type | Sequence bits | Privacy Code |
| 1011 | 10 | 30 bits |

Message Type 12: Private Content and Distributor ID with DTS

Message Type 12 is used to keep the Content ID, Distributor ID, and DTS private. (In a WaterCast environment, this watermark message type takes about 4 seconds to detect. However, one-second accuracy can be obtained by checking each sequence packet is read in between each DTS payload.).

| Message type | Sequence bits | Content ID |
|---|---|---|
| 1100 | 00 | 30 bits |
| Message type | Sequence bits | Distributor ID |
| 1100 | 01 | 30 bits |
| Message type | Sequence bits | Embedding DTS |
| 1100 | 10 | 30 bits |
| Message type | Sequence bits | Privacy Code |
| 1100 | 11 | 30 bits |

Message Type 13: Forensic ID

Message Type 13 is used to uniquely, e.g., forensically, identify the content's rendering equipment or a user account for the content so that illegal used content can be traced via this forensic ID. This message type would be added as an additional layer and in conjunction with Message Type 0. (In a WaterCast environment, this watermark message type takes about 2 seconds to detect, but may be randomly placed throughout the content to increase robustness to collusion attack. Thus, the WaterCast detector may need much more than 1 second of content to find the Forensic ID.).

Forensic identification requires two pieces of information. The Forensic Owner ID refers to the owner of the private forensic database. The Forensic ID refers to the identification of the user. For video systems, this is could be a 32 bit smart-card ID.

| Message type | Sequence bits | Forensic Owner ID/ Forensic ID |
|---|---|---|
| 1101 | 00 | 28 bits/2 bits |
| Message type | Sequence bits | Forensic ID |
| 1101 | 01 | 30 bits |

Of course, these message types can be variously combined to adequately identify the content, distribution, and usage and/or to convey additional information. Since the message type in this example includes 4 bits, a total of 16 message types can be used. (Of course increasing the message type bit field can expand the total allowable number of message types.).

6.8.7 APPLICATION EXAMPLES

6.8.7.1 Advertising Broadcast Monitoring

To monitor broadcast advertisements or segments, an advertisement is preferably digitally watermarked to include a payload message type 5, defined above, where the distributor ID includes a broadcasting network ID (or broadcaster ID) that broadcasts the advertisement. A watermark detector uses the content ID to obtain the content title and content owner via a central router and database. Of course the database can be local with respect to the detector, or can be centralized or distributed. The watermark detector extracts the distributor ID. The database is interrogated with the distributor ID to determine the broadcaster. Extracting a content ID and distributor ID from the Message Type 5 enhances accuracy. These IDs can be used to interrogate the database to retrieve confirming information. The time stamp (DTS) marks an interval of time (e.g., every three seconds of absolute time), and is used by the watermark detector to ensure the correct section or segment of the advertisement is played. (A private key functionality can be obtained using message type 12 as described above.).

Alternatively, an advertisement can use message type 3 to publicly monitor broadcasts, or message type 10 to privately monitor broadcasts. The system is similar to the message types described above, except that a tuner/receiver that receives the broadcast signal (e.g., a TV signal), and then communicates the signal to a watermark detector, determines the broadcast network ID (e.g., the outbound channel ID) since the tuner knows which station is being monitored. This context data is sent with the content ID and time information to a router for database storage. Another alternative method uses message type 0 and message type 4 as two separate layers for a public system, message type 0 and message type 11 for a public content ID and private DTS and watermark embedder code, or message type 7 and message type 11 for a private broadcast monitoring system. This system is similar to the above alternative, except that a time stamp can be used to confirm accuracy.

The system could also use only message type 0 and count each payload for timing information. Similarly, message type 0 and message type 1 can be combined for a public system or message type 8 for a private system could be used in two layers, and each payload retrieved is counted for timing information.

All these options exemplify the flexibility of the public payload architecture. In addition, they exemplify how the public payload architecture enables public and private payloads that can be detected by the same detector, thus enabling the monitoring system to expand with reasonable costs.

6.8.7.2 News Broadcast Monitoring Example

For monitoring news broadcasts, a news segment preferably includes a content ID as a message type 0, e.g., in layer 3. The message type 0 is redundantly embedded throughout a news story to represent the news source such as CNN. A sub-segment of the news story may have a content ID as a message type 0, e.g., in layer 1, to represent a section of the news story that is attributable to Reuters. Another, sub-segment of the final content may have a content ID as a message type 0, e.g., in layer 2, to represent a section of the story attributable to ABC news.

A watermark detector working with a central router and database can detect and decode these content IDs and log the usage of the news stories such that the correct royalties can be paid. If royalties are based upon amount of usage, the number of content IDs can be counted to determine the time. A message type 3 with DTS can be used to determine or confirm accuracy.

6.8.7.3 iTV Example

In an interactive TV (iTV) example, a service operator is uniquely identified such that correct information is provided for that service operator based upon its carriage agreements. For video content, a message type 0 preferably carries the content ID such that interactive information or a web link to information can be retrieved from a local database residing in (or communicating with) the service provider's head-end.

Alternatively, a message type 2 is used and a central router sends the detected watermark payload (or ID) to a remote database that provides corresponding interactive information or Internet. Similarly, message type 0 could be used in layer 1 to identify the content, and message type 1 could be used in layer 2 to identify the service provider.

This alternative configuration can also be used with a message type 0. The watermark detector, possibly located in the head-end or consumer's set-top box, determines the service provider. This context information is sent to the central router and/or related database along with the watermark payload.

6.8.7.4 European Broadcasting Union (EBU) Example

The EBU has a watermarking infrastructure where: W1 is a 64-bit watermark that identifies content ownership; W2 is a 64-bit watermark that identifies sending and receiving broadcasters; and W3 is a 64-bit watermark that identifies a receiving device.

Our inventive payload structure can provide this information with three or four layers of 36 bits (108 bits/sec for 3 layers or 144 bits/sec for 4 layers, respectively) as opposed to three 64-bit as required by EBU (192 bits for 3 layers). Preferably, our inventive architecture relies upon a central router and ID registration system, whereas the EBU allows for multiple registration authorities. Note that private and secure remote databases can be supported with the central router.

Watermark W1 can be represented by a content ID embedded using message type 0 in layer 1. Watermark W2 can be represented with a distributor ID for the content provider embedded in message type 1 in layer 2, and a distributor ID for the content provider embedded in message type 1 in layer 3. Alternatively, both distributor IDs can be embedded in layer 2 via message type 6. Watermark W3 can represented with a Forensic ID embedded in a message type 13 in layer 3 or 4, depending which distributor message type is used.

A central router and related database links the Content ID to the content owner, Distributor IDs to content providers and service providers, appropriately, and a Device ID to a consumer.

Alternatively a message type 2 that contains the Content ID and Distributor ID in one layer could be used for layer 1 to satisfy many EBU requirements, while reducing the number of layers to embed to two layers at 72 bps. The other layer would be the Forensic ID as message type 2 in layer 2. Finally, any or all of the private message types could be substituted for the corresponding public message type for a semi- or completely-private system.

In summary, this public payload architecture enables EBU functionality with many fewer watermarked bits.

6.8.8 Other Remarks

It should be noted that while we believe that our inventive layering and watermark types are ideally suited for Phillip's Watercast system, our invention is equally suited for other watermarking systems as well. Our inventive techniques will aid systems where multiple parties or entities handle watermarked content, or where content has a need to be identified.

As described above, the privacy code allows the watermark payload to be read, but the privacy code may block the detector from sending the payload to the wrong party. However, a pirate detector, where the pirate has obtained the secret watermarking key and algorithm, could obtain the payload.

This can be stopped by encrypting the payload, so that the pirate detector cannot read the correct payload. However, if the same payload is encrypted each time, the result is different than the original payload, but identical each repetition of the payload. This may allow the pirate to create their own content ID and database, although different than the official content ID and database.

This can be stopped by adding a random bit or several random bits to the payload that change each repetition. As such, the encrypted payload will change each repetition, and be useless without the correct decryption key.

An example is shown below where the sequence number is randomized for a private Content ID. This is acceptable since the whole payload needs to be read before being decrypted, and, as such, sequence information will not speed the detection. The signature of the content ID helps guarantee that the correct encryption key is used as well as scramble the content ID with more bits. Note that the message type is not encrypted so the system can read the message type and decrypt the content ID and signature.

| Message type | Random bits | Content ID (encrypted) |
| --- | --- | --- |
| 0111 | 00 | 30 bits |

| Message type | Random bits | Signature of Content ID (encrypted) |
| --- | --- | --- |
| 0111 | 01 | 30 bits |

Alternatively, a random packet could be added to each payload.

7 WATERMARK PROTOCOL

FIG. 11 illustrates a standard interface with emphasis on the watermark protocol.

7.1 Watermark Protocol Overview

The Watermark Protocol is the interface that defines the format of the embedded bits after being processed by the watermark algorithm. The watermarking algorithm is the method in which the Watermark Payload is embedded in the content. Some watermarks employ a pseudo-random spreading key and error correction bits. The Watermark Protocol is commonly dependent on the content type, such as audio or video, and its psychophysical characteristics.

7.2 Protocol Details

The Watermark Protocol should, in general, be computationally efficient, robust and imperceptible enough, as defined above. Most importantly, preliminary calculations show that a sample watermark decoder (e.g., the Philips' Watercast system) can read a 32-bit payload using, at most, 24% of the Trimedia TM32, and that amount of processing power remains is available in common set top boxes.

7.3 Layered or Combined Approach

To be embedded, the Watermark Payload types can be combined into one large protocol, or consist of several protocol layers. It appears that embedding and reading two or three watermarks is similar to one larger watermark. If this is true, the layer approach should be used since it has the advantages of allowing more watermark data to be added over time. If a layered approach is not used, content owner usage model C and distributor usage model H are impossible, and the overall system is limited (see FIG. 5).

The layers may be added as a transaction occurs (usage model C or H). In addition, the Class 1 watermarking applications only require content-owner layers. Then, at a later time, when the technology has evolved such that the distributor layers can be added, the distributor layers can be made available for Class 2 and 3 watermarking applications. This approach is identified in Section 6.5.

7.4 Continuous Reading

It is desired that the Watermark Protocol read the bits quickly. However, it is expected that, especially with audio, this will take many seconds. Thus, for Connected Applications that require the user to perceive a fast response time, the watermark reader continuously reads the payload and stores it. As such, when the consumer wants to connect, the response will be immediate, unless the content was just started.

8. STANDARDIZATION FOR THIRD PARTY VENDORS

A Central Server and Database become more useful as more content is registered, assuming it is using standard client IDs and high-level interfaces. Thus, the systems should be as open as possible and as easy to use as possible such that other vendors can be licensed to use the system. Vendors may include international organizations, such as EBU or cIDf, or other companies. Such vendors will have rights to use Digimarc's IP and the existing Central Server. In addition, the vendor may create and maintain a proprietary Product Handler, use an existing Product Handler, have Digimarc create and maintain an additional Product Handler, or any alternative combination.

Thus, the third party need only comply with the higher-level framework, including the Connected-Content Response, Connected-Content Message, and Application Message interfaces, preferably using pre-defined types. If the vendor defines a new interface type, they should register it with the Central Servers and Central Databases. In other words, it is not advantageous to leverage the existing system and IP to force other vendors to use a standard Watermark Payload and protocol.

In addition, the vendor is expected to conform to Digimarc's ID registration specifications and use Digimarc's Central Databases of unique Content-Owner IDs.

To this end, the vendor is required to conform to the following:
Connected-Content Response
  Accept XML packet with return code, URLs and message data
Connected-Content Message
  XML Header with Vendor and Application data sent via the Central Servers, possibly then routed to a client server
    Except for Asset Management, which can bypass the Central Servers
  XML Body Primary Information with Application Message and related context data
    Secondary Information can be vendor specific
Application Message
  16 bits for version, and as many information bits as required
    Preferably, matching type 4
    If not, they should register the new Application Message type with the Central Servers.

Embedded data
  Watermark or metadata
  Enough bits to uniquely identify content
ID registration specifications
  Use the Central Databases of unique Content-Owner IDs
  Use the Central Databases of unique Distributor IDs
  Vendors can use proprietary Object IDs

9 CONNECTED-CONTENT MESSAGE AND RESPONSE EXAMPLES

9.1 Request for URL

---
i. Connected-Content Message Data

XML Header
    Required Information -
        Vendor    = Digimarc
        Appl      = VB
Message Body
    Required Information -
        Req       =RFU
        Ver       =Application version number
        ApM       =Application Message
        Fmt       =Format
        Cxt       =Context
        Env       =Environment
    Optional Information -
        UID       =User's ID
        MID       =Machine ID
---

9.1.2 Connected-Content Message Example

---
```
<?xml version="1.0"?>
<Content>
<vendor>Digimarc</vendor>
<appl>VB</appl>
<prod>
    <Req>RFU</Req>
    <Ver>1.0</Ver>
    <ApM>0001 0210 00000001 01 000000000000000000007B
    00000000000000000001E240 00 0000000000000000000
    0000000000000000000 00000000000000000000[1]</ApM>
    <Fmt>MPEG-2 video</Fmt>
    <Cxt>Windows PC</Cxt>
    <Env>Real Jukebox</Env>
    <UID>1012</UID>
    <MID>1232</MID>
</prod>
</Content>
```
---

[1] Hex for [1, 528, 1, 0, 1, 123, 123456, 1, 0, 0, 0]. Used in all examples.

9.1.3 Connected-Content Response Data
RtnCode=Success/Error number (Success=1)
URL=Associated URL
Exp=Expiration date/time (GMT) for caching purposes—format of mm/dd/yyyy hh:mm:ss
  or
RtnCode=Success/Error number (Error <0)
URL=URL associated with specified error code
MsgText=message text
Error reasons:
  −1 Content is registered, but no URL in database. Please contact content owner.
  −2 Content is registered, but URL is marked as inactive. Please contact content owner.
  −3 No record in database matching the content. Please contact content owner.
  −4 Request format error—incomplete data. Please contact the product manufacturer.

9.1.4 Connected-Content Response Success Example

---
```
<?xml version="1.0"?>
<Content>
<RtnCode>1</RtnCode>
<URL>http//www.digimarc.com/products.html</URL>
</Content>
```
---

9.2 Request for Configuration

9.2.1 Connected-Content Message Data

---
XML Header
    Required Information -
        Vendor    = Digimarc
        Appl      = VB
Message Body
    Required Information -
        Req       =RFC
        OS        =User PC Operating System
---

9.2.2 Connected-Content Message Example

---
```
<?xml version="1.0"?>
<Content>
<vendor>Digimarc</vendor>
<appl>VB</appl>
<prod>
    <Req>RFC</Req>
    <OS>Win98</OS>
</prod>
</Content>
```
---

9.2.3 Connected-Content Response Data

RtnCode=Success/Error number (Success=1)
Ver=Latest Application version# available for download
https=yes (or n) [future capability]
GCURL=URL used to route subsequent Application requests [future capability]
  or
RtnCode=Success/Error number (Error <0)
URL=URL associated with specified error code
MsgText=message text
Error reasons:
  −4 Request format error—incomplete data. Please contact product manufacturer.

−5 Unknown Operating System. Please contact product manufacturer.

9.2.4 Connected-Content Response Error Example

```
<?xml version="1.0"?>
<Content>
<RtnCode>−4</RtnCode>
<URL>http//www.digimarc.com/errors/m4.html</URL>
<Data>Unknown Operating System. Please contact product manufacturer.</Data>
</Content>
```

9.3 Request for Associated URLs

9.3.1 Connected-Content Message Data

```
XML Header
    Required Information -
        Vendor      = Digimarc
        Appl        = VB
Message Body
    Required Information -
        Req         = RFA
        Ver         = Application version number
        ApM         = Application Message
        Fmt         = Format
        Cxt         = Context
        Env         = Environment
```

9.3.2 Connected-Content Message Example

```
<?xml version="1.0"?>
<Content>
<vendor>Digimarc</vendor>
<appl>VB</appl>
<prod>
    <Req>RFU</Req>
    <Ver>1.0</Ver>
    <ApM>0001 0210 00000001 01 0000000000000000000007B
    00000000000000000001E240 00 000000000000000000000
    0000000000000000000 0000000000000000000² </ApM>
    <Fmt>MPEG-2 video</Fmt>
    <Cxt>Windows PC</Cxt>
    <Env>Real Jukebox</Env>
</prod>
</Content>
```

²Hex for [1, 528, 1, 0, 1, 123, 123456, 1, 0, 0, 0]. Used in all examples.

9.3.3 Connected-Content Response Data

RtnCode=Success/Error number (Success=1)
URL1=Associated URL
Exp1=Expiration date/time (GMT)
URL2=Associated URL2
Exp2=Expiration date/time (GMT)
. . .
URL'n'=Associated URL
Exp'n'=Expiration date/time (GMT)
  or
RtnCode=Success/Error number (Error <0)

URL=URL associated with specified error code
MsgText=message text
Error reasons:
−1 Content is registered, but no URL in database. Please contact content owner.
−2 Content is registered, but URL is marked as inactive. Please contact content owner.
−3 No record in database matching the content. Please contact content owner.
−4 Request format error—incomplete data. Please contact the product manufacturer.

9.3.4 Connected-Content Response Success Example

```
<?xml version="1.0"?>
<Content>
<RtnCode>1</RtnCode>
<URL>http//www.newco.com/products.html</URL>
<URL>http//www.philips.com/products.html</URL>
<URL>http//www.digimarc.com/products.html</URL>
</Content>
```

9.4 Request for Transaction Download

[Need to account for locally cached redirections. One request per local redirection]

9.4.1 Connected-Content Message Data

```
XML Header
    Required Information -
        Vendor      = Digimarc
        Appl        = VB
Message Body
    Required Information -
        Req         = RFT
        Ver         = Application version number
        ApM         = Application Message
        Fmt         = Format
        Cxt         = Context
        Env         = Environment
    Optional Information -
        UID         = User's ID
        MID         = Machine ID
```

9.4.2 Connected-Content Message Example

```
<!xml version="1.0"?>
<Content>
<vendor>Digimarc</vendor>
<appl>VB</appl>
<prod>
    <Req>RFU</Req>
    <Ver>1.0</Ver>
    <ApM>0001 0210 00000001 01 0000000000000000000007B
    00000000000000000001E240 00 000000000000000000000
    0000000000000000000 0000000000000000000³ </ApM>
    <Fmt>MPEG-2 video</Fmt>
    <Cxt>Windows PC</Cxt>
    <Env>Real Jukebox</Env>
    <UID>1012</UID>
    <MID>1232</MID>
```

9.4.3 Connected-Content Response Data

RtnCode=Success/Error number (Success=1)
Or
RtnCode=Success/Error number (Error <0)
URL=URL associated with specified error code
MsgText=message text
Error reasons:
−4 Request format error—incomplete data. Please contact product manufacturer.

9.4.4 Connected-Content Response Success Example

```
<?xml version="1.0"?>
<Content>
<RtnCode>1</RtnCode>
</Content>
```

10 APPENDICES

10.1 Appendix A: Connected-Content Response Format Details

The Connected-Content Response is XML and is formatted as follows. Successful replies include a return code of 1 and the related URL Errors return a code that is less than zero with the error message.

XML Response DTD

```
<!DOCTYPE list [
<!ELEMENT Content  (RtnCode, URL, Data)>
```

[3] Hex for [1, 528, 1, 0, 1, 123, 123456, 1, 0, 0, 0]. Used in all examples.

XML Response DTD

```
<!ELEMENT RtnCode  (#PCDATA)>
<!ELEMENT URL  (#PCDATA)>
<!ELEMENT Data  (#PCDATA)>
]>
```

10.2 Appendix B: Connected-Content Message Format Details

Transmission Method
  The Central Routers support the http protocol.

XML Header and Body Message DTD

```
<!DOCTYPE list  [
<!ELEMENT Content  (vendor, appl, prod, Req, Ver, Apm, Fmt, Cxt, Env, UID, MID)>
!ELEMENT vendor  (#PCDATA)>
!ELEMENT appl  (#PCDATA)>
!ELEMENT prod  (#PCDATA)>
    <!ELEMENT Req  (#PCDATA)>
    <!ELEMENT Ver  (#PCDATA)>
    <!ELEMENT ApM  (#PCDATA)>
    <!ELEMENT Fmt  (#PCDATA)>
    <!ELEMENT Cxt  (#PCDATA)>
    <!ELEMENT Env  (#PCDATA)>
    <!ELEMENT UID  (#PCDATA)>
    <!ELEMENT MID  (#PCDATA)>
]>
```

At this time, for audio and video commerce, the vendor will be Digimarc and the application will be either VB (VideoBridge) or AB (AudioBridge).

10.3 Appendix C: Example Application Message C-Class

The following C language class can be used to read the Application Message type 4 version 1. Note that whether the content is audio or video is implicitly part of the CMC message (m_wCMC). Positive numbers represent audio and negative numbers represent video.

```
class ApplicationMessageType4v1
{
private:
   short  m__wMessageVersion
   short  m__wCMC
   short  m__wWMTypeContentOwner
   long   m__lContentOwnerID
   long   m__lContentOwnerObjectID
   short  m__wWMTypeDistributor
   long   m__lDistributorID
   long   m__lDistributorObjectID
   long   m__lMiscInfo
public:
   short GetMessageVersion( )  {return m__wMessageVersion;};
   SetMessageversion(wMV)  {m__wMessageVersion=wMV;};
   short GetCMC( )  {return m__wCMC;};
   SetCMC (wCMC)  {m__wCMC=wCMC;};
   short GetWMTypeContentOwner( )  {return m__wWMTypeContentOwner;};
   SetWMTypeContentOwner(wWMTypeCO)  {m__wWMTypeContentOwner=wWMTypeCO;};
   long GetContentOwnerID( )  {return m__lContentOwnerID;};
   SetContentOwnerID(lCOID)  {m__lContentOwnerID=lCOID;};
   long GetContentOwnerObjectID( )  {return m__lContentOwnerObjectID;};
   SetContentOwnerObjectID(lCOOID)  {m__lContentOwnerOjbectID=lCOOID;};
   short GetWMTypeDistributor( )  {return m__wWMTypeDistributor;};
```

-continued

```
SetWMTypeDistributor(wWMTypeD)  {m__wWMTypeDistributor=wWMTypeD;};
long GetDistributorID( )  {return m__lDistributorID;};
SetDistributorID(lDistributorID)  {m__lDistributorID=lDistributorID;};
long GetDistributorObjectID( )  {return m__lDistributorObjectID;};
SetDistributorObjectID(lDOID)  {m__lDistributorOjbectID=lDOID;};
long GetMiscInfo( )  {return m__lMiscInfo;};
SetMiscInfo(lMiscInfo)  {m__lMiscInfo=lMiscInfo;};
}
```

11 CONCLUDING REMARKS

To provide a comprehensive disclosure without unduly lengthening this specification, the patents and applications cited above are incorporated herein by references.

Having described and illustrated the subject technologies with reference to illustrative embodiments, it should be recognized that the invention is not so limited. For example, while the detailed description focused on digital watermarks to convey auxiliary information with audio and video content, other techniques can be used as well (e.g., VBI, digital fingerprints, header meta data, etc.).

The implementation of the functionality described above (including watermark decoding) is straightforward to artisans in the field, and thus not further belabored here. Conventionally, such technology is implemented by suitable software, stored in long term memory (e.g., disk, ROM, etc.), and transferred to temporary memory (e.g., RAM) for execution on an associated CPU. In other implementations, the functionality can be achieved by dedicated hardware, or by a combination of hardware and software. Reprogrammable logic, including FPGAs, can advantageously be employed in certain implementations.

It should be recognized that the particular combinations of elements and features in the above-detailed embodiments are exemplary only; the interchanging and substitution of these teachings with other teachings in this and the incorporated-by-reference patents/applications are also contemplated.

In view of the wide variety of embodiments to which the principles and features discussed above can be applied, it should be apparent that the detailed embodiments are illustrative only and should not be taken as limiting the scope of the invention.

What is claimed is:

1. An apparatus comprising:
electronic memory to receiving audio content or video content, the audio content or video content having a steganographic watermark hidden in data representing audible portions of the audio content or hidden in data representing picture elements of the video content;
one or more electronic processors programmed for:
analyzing the audio content or the video content for the steganographic watermark, the steganographic watermark being of a format consisting of: i) a content ID linking or indexing to interactive information or a web content retrieved from a local database residing in or communicating with a cable provider's head-end system, or ii) a content ID linking to or indexing into a remote database that provides corresponding interactive information or web content.

2. The apparatus of claim 1 in which the one or more electronic processors are further programmed to control access to the audio content or video content based at least in part on the content ID.

3. The apparatus of claim 1 in which the one or more electronic processors are operating to carry out at least one of the functions recited therein.

4. An apparatus comprising:
electronic memory for buffering data representing audio or video;
an electronic processor programmed for:
(i) controlling receipt of data representing audio or video, the data representing audio or video comprising at least two digital watermark layers,
the first watermark layer comprising a content identifier which uniquely identifies the content, and
the second watermark layer comprising a distributor identifier which identifies a distributor or distribution channel associated with the content; and
(ii) embedding a third watermark layer in the audio or video, in which the third watermark layer is embedded through alterations to data representing audible portions of the audio or through alterations to data representing video picture elements of the video, and in which each of the first watermark layer, the second watermark layer and the third digital watermark layer are embedded in the audio or video content with different watermark protocols or different watermark keys.

5. The apparatus of claim 4 in which the electronic processor is operating to carry out at least one of the functions recited therein.

6. An apparatus comprising:
an electronic processor configured for:
i) digital watermarking a content item including at least an advertisement, the digital watermarking including a content identifier, a distributor identifier and a broadcaster identifier related to a broadcaster of the advertisement, in which each of the content identifier, distributor identifier and broadcast identifier is provided as a distinct digital watermark layer, and
ii) associating the content identifier in a computerized data registry with at least some information related to the content item.

7. The apparatus of claim 6 in which the electronic processor is operating to carry out at least one of the functions recited therein.

* * * * *

UNITED STATES PATENT AND TRADEMARK OFFICE
CERTIFICATE OF CORRECTION

PATENT NO. : 8,103,879 B2  Page 1 of 1
APPLICATION NO. : 12/555618
DATED : January 24, 2012
INVENTOR(S) : Levy et al.

It is certified that error appears in the above-identified patent and that said Letters Patent is hereby corrected as shown below:

Title page, item (63), under "Related U.S. Application Data", in Column 1, Lines 4-5, delete "application No. 12/555,618," and insert -- application No. 11/153,520, --.

Page 3, item (56), under "Other Publications", in Column 2, Line 21, delete "Fascimile" and insert -- Facsimile --.

Signed and Sealed this
Tenth Day of July, 2012

David J. Kappos
*Director of the United States Patent and Trademark Office*